United States Patent
Kajiwara et al.

(10) Patent No.: US 6,847,735 B2
(45) Date of Patent: Jan. 25, 2005

(54) IMAGE PROCESSING SYSTEM, IMAGE PROCESSING APPARATUS, IMAGE INPUT APPARATUS, IMAGE OUTPUT APPARATUS AND METHOD, AND STORAGE MEDIUM

(75) Inventors: Hiroshi Kajiwara, Tokyo (JP); Makoto Sato, Tokyo (JP); Hiroki Kishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 09/875,011

(22) Filed: Jun. 7, 2001

(65) Prior Publication Data

US 2002/0018597 A1 Feb. 14, 2002

(30) Foreign Application Priority Data

Jun. 7, 2000 (JP) ........................................ 2000/170587
Jan. 17, 2001 (JP) ........................................ 2001-009125

(51) Int. Cl.$^7$ .................................................. G06K 9/36
(52) U.S. Cl. ..................... 382/233; 382/245; 382/246; 382/247; 382/240; 382/250; 382/251; 358/426.06; 358/505; 358/474; 375/240.02; 375/240.03
(58) Field of Search ................................. 382/239, 240, 382/232, 233, 238, 245, 236, 248, 244, 247, 249, 250, 251, 253, 277; 375/240.02, 240.03, 240.01, 240.11, 240.08, 240.06, 240.12, 240.18, 240.19, 240.22, 240.23, 240.24, 240.25, 240.27; 358/426.02, 426.04, 426.05, 426.06, 408, 474, 505; 348/398.1, 420.1; 341/79

(56) References Cited

U.S. PATENT DOCUMENTS

| | | | | |
|---|---|---|---|---|
| 5,657,015 A | * | 8/1997 | Nakajima et al. | 341/61 |
| 6,052,205 A | * | 4/2000 | Matsuura | 358/426.12 |
| 6,441,754 B1 | * | 8/2002 | Wang et al. | 341/50 |
| 6,675,185 B1 | * | 1/2004 | Mitchell et al. | 708/400 |
| 2001/0008544 A1 | * | 7/2001 | Ishiyama | 375/240.12 |
| 2001/0019335 A1 | * | 9/2001 | Takeo | 345/670 |

* cited by examiner

Primary Examiner—Bhavesh M. Mehta
Assistant Examiner—Ali Bayat
(74) Attorney, Agent, or Firm—Fitzpatrick, Cella, Harper & Scinto

(57) ABSTRACT

This invention has as its object to attain efficient encoding/decoding even when the processing time, memory, arithmetic cost, and the like of an apparatus are limited.

Encoded image data is input to an image processing apparatus (1) to obtain transform coefficients of subbands. The transform coefficients required to decode an image from its head position line by line are encoded by Golomb coding using one line of a subband as a unit to generate a code sequence, which is output to an image output apparatus (2). The image output apparatus (2) reconstructs an image by decoding the Golomb encoded data, dequantizing the coefficients, and computing the inverse discrete wavelet transforms of the coefficients, and outputs the reconstructed image.

32 Claims, 22 Drawing Sheets

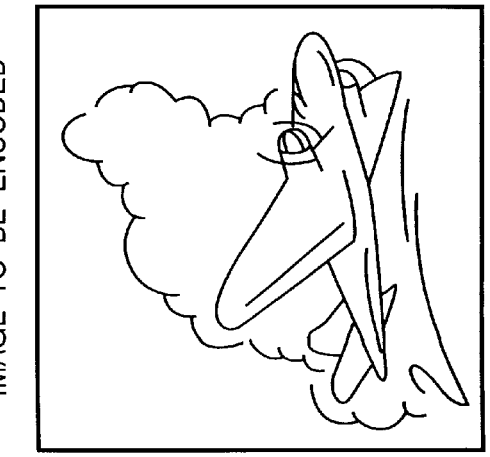
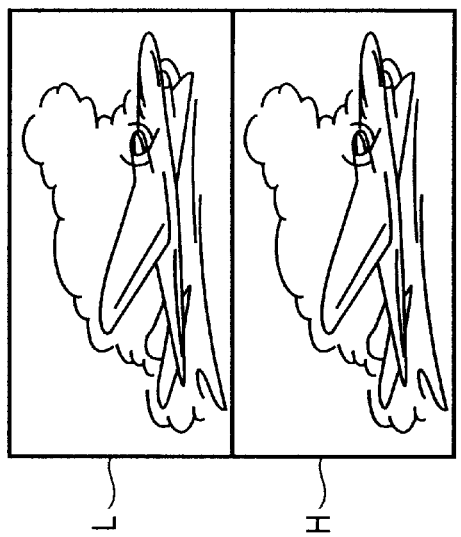
FIG. 4A  FIG. 4B  FIG. 4C

FIG. 7

| k / v | 0 Variable-length part | 1 Variable-length part | 1 Fixed-length part | 2 Variable-length part | 2 Fixed-length part | 3 Variable-length part | 3 Fixed-length part |
|---|---|---|---|---|---|---|---|
| 0 | 1 | 1 | 0 | 1 | 00 | 1 | 000 |
| 1 | 01 | 1 | 1 | 1 | 01 | 1 | 001 |
| 2 | 001 | 01 | 0 | 1 | 10 | 1 | 010 |
| 3 | 0001 | 01 | 1 | 1 | 11 | 1 | 011 |
| 4 | 00001 | 001 | 0 | 01 | 00 | 1 | 100 |
| 5 | 000001 | 001 | 1 | 01 | 01 | 1 | 101 |
| 6 | 0000001 | 0001 | 0 | 01 | 10 | 1 | 110 |
| 7 | 00000001 | 0001 | 1 | 01 | 11 | 1 | 111 |
| 8 | 000000001 | 00001 | 0 | 001 | 00 | 01 | 000 |

FIG. 12

|  | VARIABLE - LENGTH PART | FIXED - LENGTH PART |  |
|---|---|---|---|
| GL(S,0,b) | 0 0 0 1 | 0 0 1 | |
| GL(S,1,b) | 0 1 | 1 0 1 | CODE HAVING MAXIMUM |
| GL(S,2,b) | 0 0 0 0 1 | 0 1 0 | CODE LENGTH $L_{max}$ |
| GL(S,3,b) | 1 | 0 0 1 | |
| GL(S,4,b) | 0 0 1 | 1 1 0 | |
| GL(S,5,b) | 0 0 0 0 0 0 0 0 1 | 0 1 1 | |
| GL(S,6,b) | 0 0 1 | 1 1 1 | |
| GL(S,7,b) | 0 0 0 0 1 | 0 1 0 | |

IMAGE PROCESSING SYSTEM, IMAGE PROCESSING APPARATUS, IMAGE INPUT APPARATUS, IMAGE OUTPUT APPARATUS AND METHOD, AND STORAGE MEDIUM

FIELD OF THE INVENTION

The present invention relates to an image processing system for encoding and/or decoding an image, an image processing apparatus, an image input apparatus, an image output apparatus and method, and a storage medium.

BACKGROUND OF THE INVENTION

In recent years, as the technologies for image input apparatuses such as digital cameras, scanners, and the like have improved, the resolution of image data captured by such input apparatus is increasing. A low-resolution image requires a small image data volume and never disturbs coding, transfer, and storage processes. However, the image data volume becomes huge with increasing resolution, and a long transfer time is often required. Hence, the coding and storage processes require a large storage size.

As a method of efficiently transferring and displaying such large-size image data, scalable transfer of image data has received a lot of attention. In this method, data are transferred in turn from an image having low image quality, so that the receiving side can recognize an outline of an image in an early stage of image data transfer, and data required to reclaim an image with higher image quality are transferred in turn. As a result, the quality of an image reclaimed at the data receiving side improves gradually.

As a coding method suitable for such scalable transfer, a coding method that implements spatial scalability using wavelet transformation as sequence transformation, and implements SNR scalability using bit plane coding as entropy coding has been studied.

FIG. 2 shows an example of an image encoding apparatus using the aforementioned coding method. Referring to FIG. 2, reference numeral 201 denotes an image input unit; 202, a discrete wavelet transformer; 203, a coefficient quantizer; 204, a bit plane encoder; 205, a code sequence forming unit; and 206, a code output unit.

The operation in the image encoding apparatus shown in FIG. 2 will be explained below. Pixel data P(x, y) that form an image to be encoded in the raster scan order are input to the image input unit 201. x and y indicate the horizontal and vertical positions of a pixel. The image input unit 201 comprises a storage device such as a hard disk, magnetooptical disk, memory, or the like, which stores image data, an image sensing device such as a scanner or the like, an interface for a network line, or the like.

The discrete wavelet transformer 202 computes the two-dimensional discrete wavelet transforms of pixel data P(x, y) input from the image input unit 201 while storing them in its internal buffer (not shown) as needed, and decomposes them into seven subbands LL, LH1, HL1, HH1, LH2, HL2, and HH2. The transformer 202 then outputs coefficients of respective subbands. Let C(S, x, y) be the coefficient of each subband. Note that S represents one of subbands LL, LH1, HL1, HH1, LH2, HL2, and HH2. Also, x and y indicate the horizontal and vertical coefficient positions at (0, 0) represents the position of a coefficient at the upper left corner in each subband.

Two-dimensional discrete wavelet transformation is implemented by applying one-dimensional transformation in the horizontal and vertical directions. FIGS. 4A to 4C show processes in which an image to be encoded (FIG. 4A) undergoes one-dimensional discrete wavelet transformation in the vertical direction so as to be decomposed into low- and high-frequency subbands L and H (FIG. 4B), and these subbands further respectively undergo one-dimensional discrete wavelet transformation in the horizontal direction to be decomposed into four subbands LL, HL, LH, and HH (FIG. 4C). In this image encoding apparatus, one-dimensional discrete wavelet transformation of N one-dimensional signals x(n) (n=0 to N−1) is described by:

$$h(n)=x(2n+1)-\text{floor}\{(x(2n)+x(2n+2))/2\}$$

$$l(n)=x(2n)+\text{floor}\{(h(n-1)+h(n)+2)/4\}$$

where h(n) is a coefficient of a high-frequency subband, l(n) is a coefficient of a low-frequency subband, and floor{R} is a maximum integer smaller than real number R. Note that the coefficients h(n) are computed within the range of n=0 to floor{N/2} and coefficient l(n) are computed within the range of n 0 to floor{(N+1)/2}. Also, the two ends x(n) (n<0 and n≧N) of the one-dimensional signals x(n) required upon computing the above equations are calculated in advance from the values of one-dimensional signals x(n) (0≦n<N) by a known method.

By repetitively computing the two-dimensional discrete wavelet transforms of the subband LL obtained by the aforementioned two-dimensional discrete wavelet transformation, the subband LL is decomposed into seven LL, LH1, HL1, HH1, LH2, HL2, and HH2, as shown in FIG. 5. Note that LL in FIG. 5 is obtained by re-decomposing LL in FIG. 4C, and is not the same as LL in FIG. 4C.

The coefficient quantizer 203 quantizes coefficients C(S, x, y) of the respective subbands generated by the discrete wavelet transformer 202 using quantization steps delta(S) determined for respective subbands. If Q(S, x, y) represents the quantized coefficient value in subband S, the quantization process done by the coefficient quantizer 203 is described by:

$$Q(S, x, y)=\text{sign}\{C(S, x, y)\}\times\text{floor}\{|C(S, x, y)|/\text{delta}(S)\}$$

where sign{I} is a function which returns the positive/negative sign of integer I; 1 if I is positive or −1 if I is negative. Also, floor{R} is a maximum integer smaller than real number R.

The bit plane encoder 204 encodes the coefficient values Q(S, x, y) quantized by the coefficient quantizer 203 to generate a code sequence. A method of breaking up the coefficients of each subband into blocks, and encoding them individually to facilitate random access is known. However, encoding is done herein in units of subbands for the sake of simplicity. The quantized coefficients Q(S, x, y) (to be simply referred to as coefficient values hereinafter) of respective subbands are encoded by expressing the absolute values of the coefficient values Q(S, x, y) in each subband by natural binary values, and making binary arithmetic coding of them from the upper to the lower bits, giving priority to the bit plane direction. Where coefficient Q(S, x, y) of each subbands is expressed by natural binary, n-th bit from lowest bit of coefficient is expressed as Qn(x, y). Note that a variable n indicating a bit of a binary value is called a bit plane number, and bit plane number n represents the LSB as the 0th bit.

FIG. 6 shows the flow of a process for encoding subband S by the bit plane encoder 204.

Referring to FIG. 6, step S601 is a step of computing a maximum value Mabs(S) of the absolute values of the coefficients in subband S, step S602 is a step of computing the number $N_{BP}(S)$ of effective bits required to express the maximum value Mabs(S), step S603 is a step of substituting the number of effective bits in the variable n, step S604 is a step of computing (n−1) and substituting it in n, step S605 is a step of encoding an n-th bit plane, and step S606 is a step of checking if n=0. The processes in the respective steps will be described in detail below.

In step S601, the absolute values of the coefficients in subband S to be encoded are checked to obtain their maximum value Mabs(S).

In step S602, the number $N_{BP}(S)$ of bits required to express Mabs(S) by a binary value is computed by:

$$N_{BP}(S) = \text{ceil}\{\log 2(\text{Mabs}(S))\}$$

where ceil{R} is a minimum integer equal to or larger than real number R. In step S603, the number $N_{BP}(S)$ of effective bits is substituted in bit plane number n. In step S604, 1 is subtracted from bit plane number n. In step S605, bit plane n is encoded using binary arithmetic coding. Note that QM-Coder is used as arithmetic coding. Since the sequence for encoding binary symbols generated in given state (context) S using this QM-Coder or the initialization and termination sequences for arithmetic coding have been explained in detail in ITU-T Recommendation T.81|ISO/IEC10918-1 recommendation, and the like as the international standards for still images, a description thereof will be omitted. At the beginning of encoding of each bit plane, the internal arithmetic encoder (not shown) of the bit plane encoder 204 is initialized. Or a termination process of the arithmetic encoder is done upon completion of encoding. Immediately after the first '1' to be encoded of each coefficient, the positive/negative sign of that coefficient is expressed by 0 or 1 and that coefficient is undergone arithmetic coding. If the coefficient is positive, 0 is output; if the coefficient is negative, 1 is output. For example, if a coefficient is −5, and the number $N_{BP}(S)$ of effective bits of subband S to which this coefficient belongs is 6, the absolute value of this coefficient is expressed by a binary value 000101, and is encoded from the MSB to the LSB upon encoding respective bit planes. Upon encoding the second bit plane (the fourth bit from the MSB), the first '1' is encoded, and the positive/negative sign '1' is encoded by arithmetic coding immediately thereafter.

In step S606, bit plane number n is compared with 0. If n=0, i.e., if the LSB plane is encoded in step S605, the encoding process of the subband ends; otherwise, the flow returns to step S604.

With the aforementioned process, all coefficients of subband S are encoded to generate code sequences CS(S, n) corresponding to bit planes n. The generated code sequences are sent to the code sequence forming unit 205 and are temporarily stored in the internal buffer (not shown) of the code sequence forming unit 205.

When encoding of the coefficients of all the subbands by the bit plane encoder 204 is complete, and all the code sequences are stored in the internal buffer, the code sequence forming unit 205 reads out the code sequences stored in the internal buffer in a predetermined order, inserts required additional information, and forms a final code sequence as the output of this encoding apparatus. The unit 205 then outputs the code sequence to the code output unit 206.

The final code sequence generated by the code sequence forming unit 205 consists of a header, and encoded data stratified into three levels, i.e., levels 0, 1, and 2. The encoded data of level 0 is comprised of code sequences CS(LL, $N_{BP}$(LL)−1) to CS (LL, 0) obtained by encoding the coefficients of the subband LL. The encoded data of level 1 is comprised of code sequences CS(LH1, $N_{BP}$(LH1)−1) to CS(LH1, 0), CS(HL1, $N_{BP}$(HL1)−1) to CS(HL1, 0), and CS(HH1, $N_{BP}$(HH1)−1) to CS(HH1, 0) obtained by encoding the coefficients of the subbands LH1, HL1, and HH1. The encoded data of level 2 is comprised of code sequences CS(LH2, $N_{BP}$(LH2)−1) to CS(LH2, 0), CS(HL2, $N_{BP}$(HL2)−1) to CS(HL2, 0), and CS(HH2, $N_{BP}$(HH2)−1) to CS(HH2, 0) obtained by encoding the coefficients of the subbands LH2, HL2, and HH2.

FIG. 3 shows the structure of the code sequence generated by the code sequence forming unit 205. Note that this encoded data has undergone a process for inserting information in header information or a marker, so that given partial data can be accessed, e.g., the number $N_{BP}$(LH1) of effective bits of the subband LH1 can be read out from the encoded data shown in FIG. 3.

The code output unit 206 externally outputs the code sequence generated by the code sequence forming unit 205. The code output unit 206 comprises, e.g., a storage device such as a hard disk, memory, or the like, an interface for a network line, or the like.

However, some problems are experienced in an image decoding apparatus that decodes encoded data generated by the conventional scalable encoding method mentioned above.

Since bit plane coding is used as entropy coding, as the coefficients to be encoded are decoded in units of subbands or blocks obtained by breaking up subbands into a given size, a large memory for storing the coefficients is required.

Furthermore, when arithmetic coding is used upon encoding binary information of each bit plane as in the above prior art, a complicated arithmetic process is required to decode arithmetic codes, resulting in larger CPU power required, a long processing time, a large circuit scale, and the like.

In order to decode images in the raster scan order from the code sequences generated by the conventional scalable coding method, many code sequences must be temporarily stored, thus requiring a larger memory size.

Since recent personal computers have gained higher performance and functions, the aforementioned problems are eliminated. However, the aforementioned problems are serious in apparatuses with limited arithmetic performance and memory size such as a printer, portable terminal, and the like.

The present invention has been made in consideration of the aforementioned problems, and has as its object to achieve efficient encoding/decoding even when the processing time, memory, arithmetic cost, and the like of an apparatus are limited.

SUMMARY OF THE INVENTION

In order to achieve the above object, an image processing system of the present invention comprises the following arrangement.

That is, in an image processing system comprising an image processing apparatus and an image output apparatus, the image processing apparatus comprises:

first input means for inputting encoded image data encoded using first entropy coding;

first decoding means for obtaining transform coefficients or quantization values of the transform coefficients by decoding the encoded image data;

encoding means for generating encoded data by encoding the transform coefficients or the quantization values of the transform coefficients obtained by the first decoding means using second entropy coding different from the first entropy coding, and generating a code sequence containing the encoded data; and output means for outputting the code sequence generated by the encoding means to the image output apparatus, and the image output apparatus comprises:

second input means for inputting the code sequence output from the output means;

second decoding means for entropy-decoding the encoded data contained in the code sequence to obtain the transform coefficients or the quantization values of the transform coefficients; and image reconstruction means for reconstructing an image on the basis of the transform coefficients or the quantization values of the transform coefficients.

Furthermore, the image processing apparatus further comprises:

code length control means for controlling a code length of the encoded data generated by the encoding means, and the image output apparatus further comprises:

code sequence restoration means for restoring the encoded data generated by the encoding means on the basis of the encoded data, the code length of which is controlled by the code length control means.

Moreover, the image processing apparatus further comprises:

setting means for setting encoded image data to be decoded by the first decoding means in correspondence with an image size the image output apparatus can output.

In order to achieve the above object, an image processing system of the present invention comprises the following arrangement.

That is, in an image processing system comprising an image input apparatus and an image processing apparatus, the image input apparatus comprises:

first input means for inputting an image;

frequency component transformation means for computing frequency component of the image to obtain transform coefficients or quantization values of the transform coefficients;

first entropy encoding means for encoding the transform coefficients or the quantization values of the transform coefficients obtained by the frequency component transformation means; and first output means for generating a code sequence containing encoded data generated by the first entropy encoding means, and externally outputting the code sequence, and the image processing apparatus comprises:

second input means for inputting the code sequence generated by the first output means;

decoding means for entropy-decoding the encoded data contained in the code sequence;

second entropy encoding means for encoding the transform coefficients or the quantization values of the transform coefficients decoded by the decoding means using second entropy coding different from the first entropy coding; and second output means for externally outputting a code sequence containing encoded data generated by the second entropy encoding means.

Furthermore, the second output means selectively outputs a code sequence that gradually improves spatial resolution, and a code sequence that gradually improves image quality, in accordance with an input from an external apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A to 4C are views for explaining the processes of two-dimensional wavelet transformation;

FIG. 7 is a table showing an example of Golomb codes when an encoding parameter k=0, 1, 2, 3;

FIG. 12 shows an example of Golomb codes;

DETAILED DESCRIPTION OF THE PREFERRED EMBODIMENTS

Preferred embodiments of the present invention will now be described in detail in accordance with the accompanying drawings.

[First Embodiment]

Figure 1:
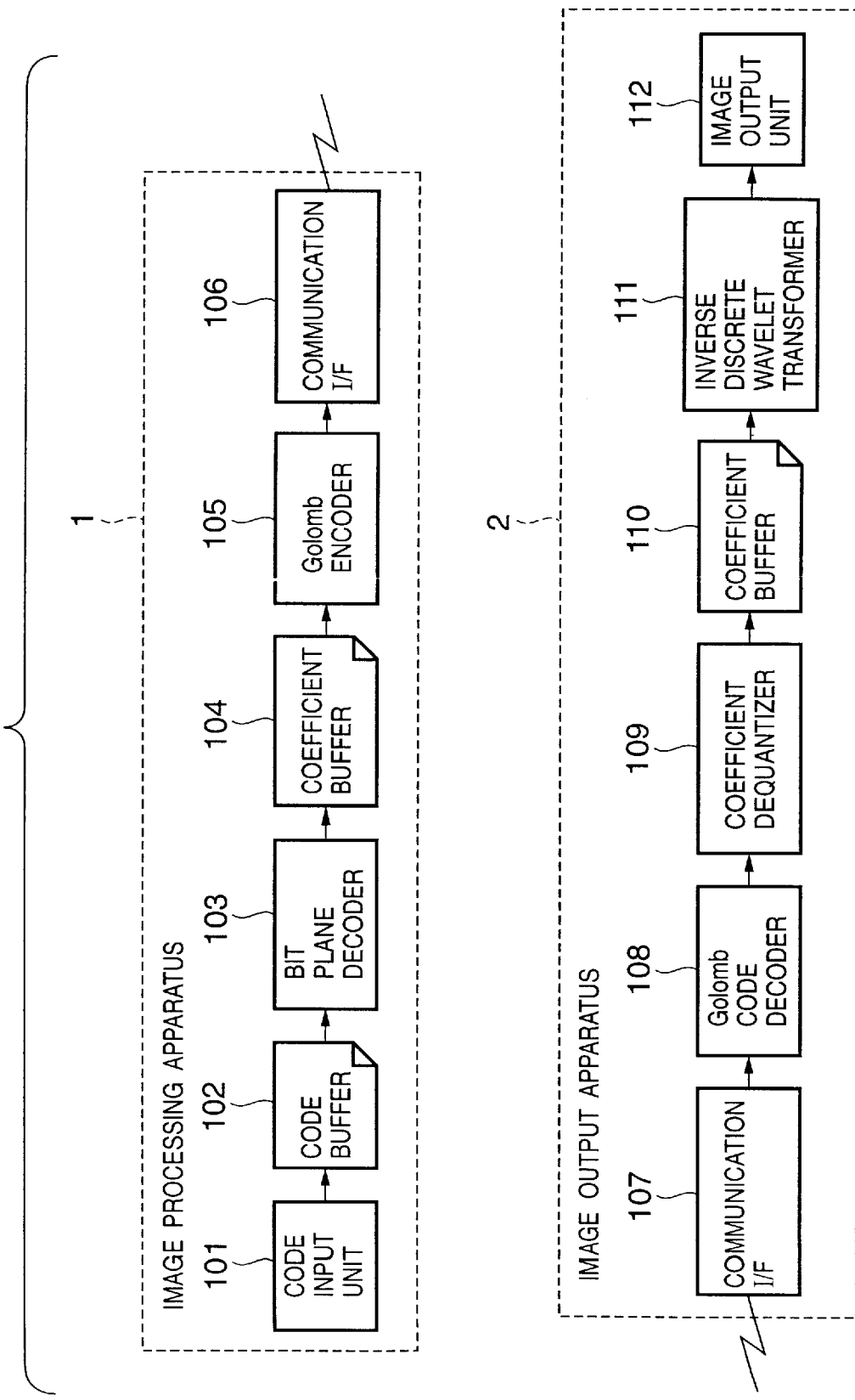
FIG. 1 is a block diagram showing the arrangement of an image processing system according to the first embodiment.

FIG. 1 is a block diagram showing the basic arrangement of an image processing system (image decoding apparatus) which includes an image processing apparatus and image output apparatus of this embodiment. Referring to FIG. 1, reference numeral 101 denotes a code input unit; 102, a code buffer; 103, a bit plane decoder; 104, a coefficient buffer; 105, a Golomb encoder; 106 and 107, communication interfaces; 108, a Golomb code decoder; 109, a coefficient dequantizer; 110, a coefficient buffer; 111, an inverse discrete wavelet transformer; and 112, an image output unit.

Figure 2:
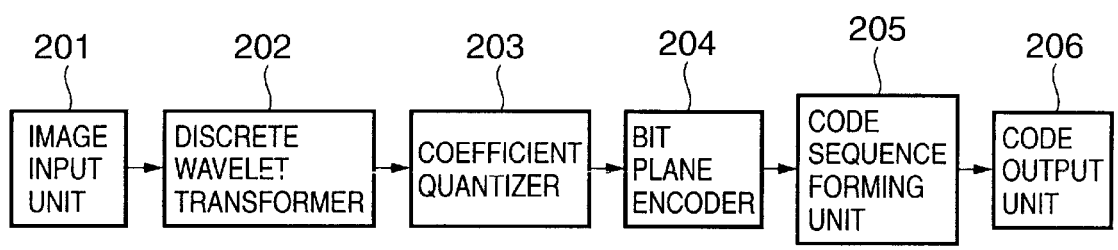
FIG. 2 is a block diagram showing the arrangement of a conventional image encoding apparatus.

This embodiment uses monochrome image data in which the luminance value of one pixel is expressed by 8 bits. In the following description, encoded data scalably encoded by the image encoding apparatus with the arrangement shown in FIG. 2 is decoded, and a decoded image is output (the same applies to the following embodiments). However, the present invention is not limited to such specific data, and can be applied to image data in which the luminance value is expressed by the number of bits other than 8 bits, e.g., 4 bits, 10 bits, 12 bits, and the like. Also, the present invention can be applied to color image data in which each pixel is expressed by a plurality of color components such as R, G, and B, Y, M, C, and K, or the like, or a luminance and chrominance/color difference components such as Y, Cr, and Cb, or the like. In this case, each component in color image data can be considered as monochrome image data. Also, the present invention can be applied to encoding of index data in which each pixel state is indicated by multi-valued information (e.g., each pixel color is indicated by an index value of a predetermined color table).

The operations of the respective units of the image processing system in this embodiment will be described in detail below with reference to FIG. 1. The image processing system of this embodiment comprises two apparatuses, i.e., an image output apparatus 2 having limited arithmetic performance and memory size, and an image processing apparatus 1 which has a larger memory size and higher arithmetic performance than the image output apparatus 2.

It can be used a recent personal computer or versatile computer, dedicated apparatus, image processing board, or the like as the image processing apparatus 1, and the image processing apparatus 1 comprises the code input unit 101, code buffer 102, bit plane decoder 103, coefficient buffer 104, Golomb encoder 105, and communication interface 106.

On the other hand, the image output apparatus 2 can be, e.g., a printer, portable terminal, portable phone, or the like, and comprises the communication interface 107, Golomb code decoder 108, coefficient dequantizer 109, coefficient buffer 110, inverse discrete wavelet transformer 111, and image output unit 112 in FIG. 1.

Figure 3:
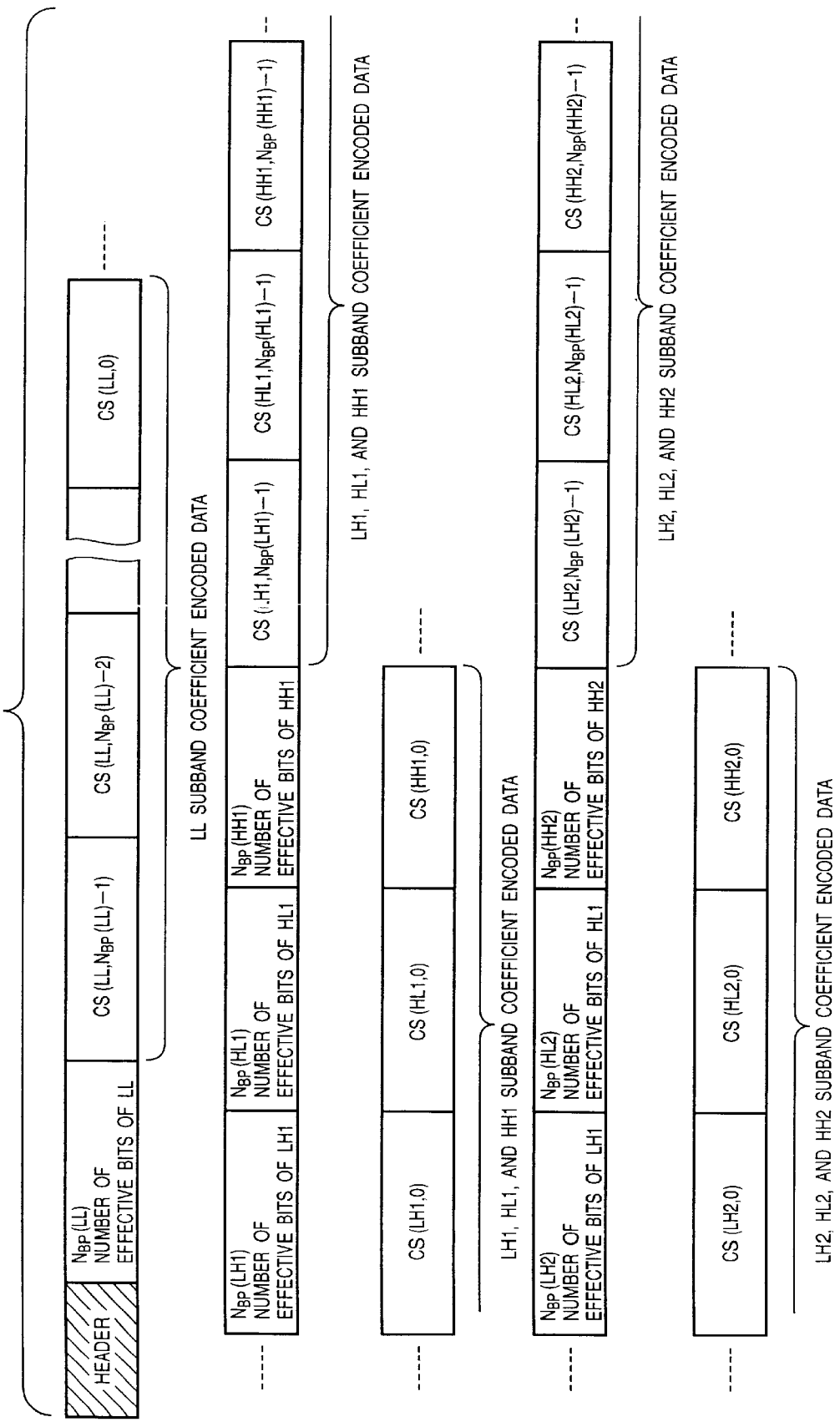
FIG. 3 shows an example of the structure of final encoded data.
Figure 5:
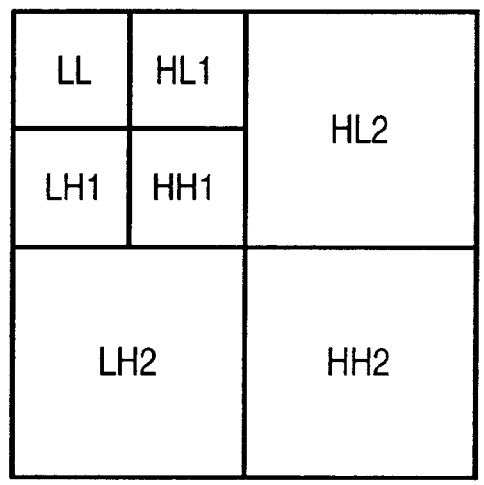
FIG. 5 is a view for explaining subband segmentation.
Figure 6:
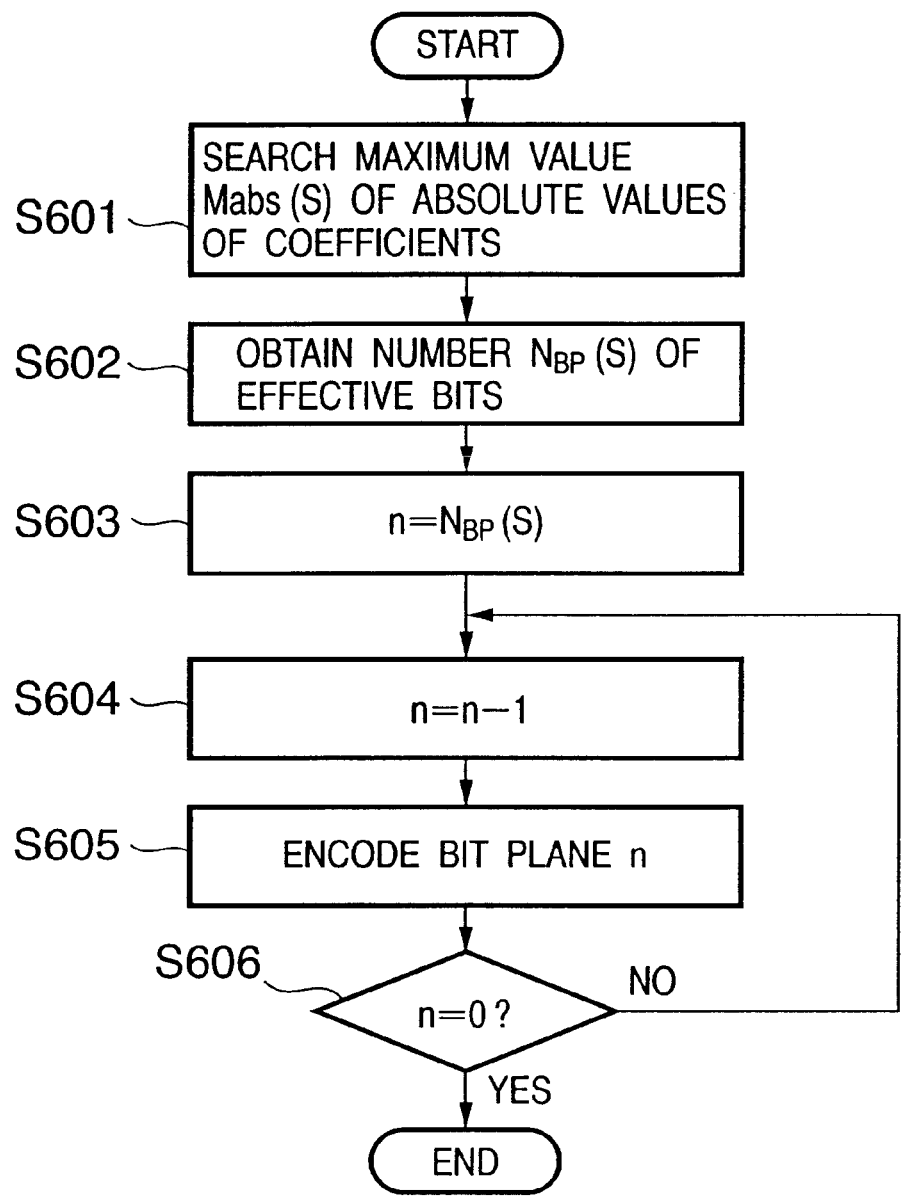
FIG. 6 is a flow chart for explaining the encoding process in a bit plane encoder 204.

Encoded image data to be decoded by the image processing system of this embodiment is input in turn from the code input unit 101. The code input unit 101 comprises, e.g., a storage medium such as a memory, hard disk, or the like, an interface to a communication line, or the like. Assume that the encoded data input from the code input unit 101 is data having the format shown in FIG. 3, which is obtained by encoding image data by the image encoding apparatus shown in FIG. 2. The sequence for generating this encoded data has already been explained previously.

The code buffer 102 stores the encoded data input from the code input unit 101 for one image.

The bit plane decoder 103 decodes seven subbands LL, LH1, HL1, HH1, LH2, HL2, and HH2 in turn from the upper to the lower bit planes, and restores and outputs the coefficients of the subbands. The decoder 103 sequentially reads out the encoded data required for decoding from the code buffer 102.

Figure 9:
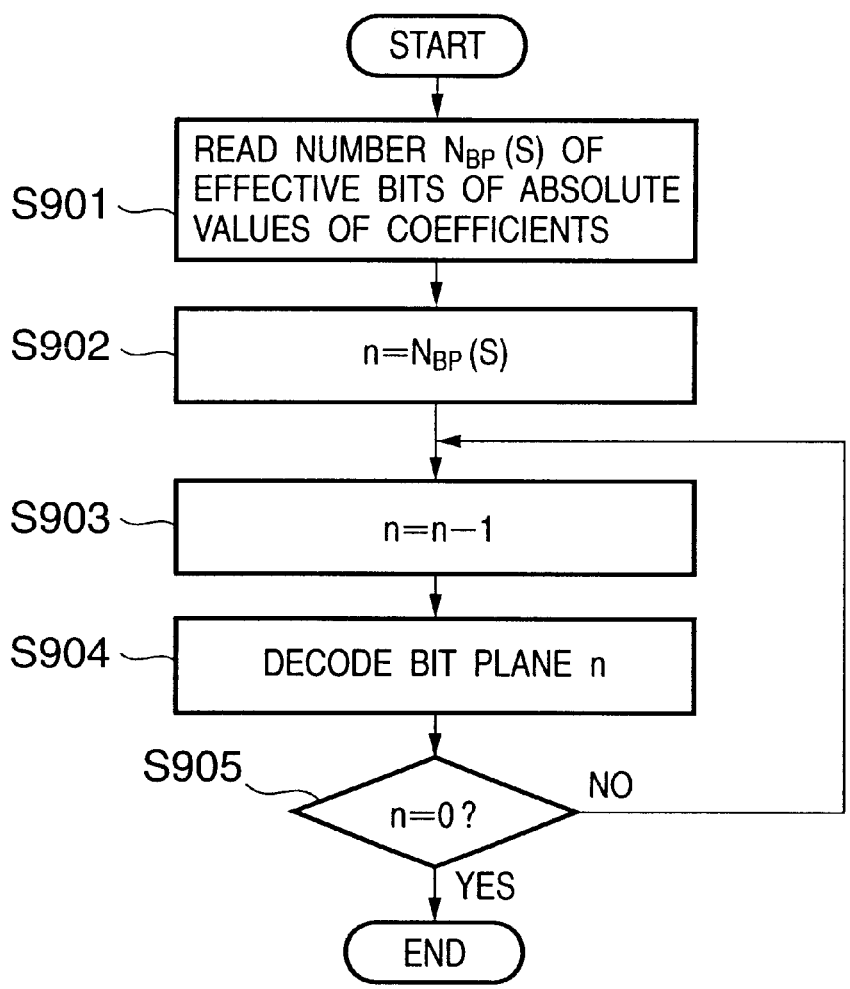
FIG. 9 is a flow chart for explaining the decoding process in a bit plane decoder 103.

FIG. 9 shows the sequence of the decoding process for decoding the coefficients of subband S of interest by the bit plane decoder 103. Referring to FIG. 9, step S901 is a step of reading out the number $N_{BP}(S)$ of effective bits required to express the absolute values of the coefficients in the subband from code sequence, step S902 is a step of substituting $N_{BP}(S)$ in n, step S903 is a step of computing (n−1) and substituting it in n, step S904 is a step of decoding an n-th bit plane, and step S905 is a step of checking if n=0.

In step S901, the number $N_{BP}(S)$ of effective bits required to express the absolute values of the coefficients in subband S to be decoded is read out from the encoded data stored in the code buffer 102. In step S902, the number $N_{BP}(S)$ of effective bits is substituted in bit plane number n. In step S903, 1 is subtracted from bit plane number n.

In step S904, encoded data CS(S, n) of bit plane n encoded by binary arithmetic coding is decoded to restore bit Qn(x, y) at the n-th bit positions of the quantized coefficients in the subband. Since an image encoded by the image encoding apparatus shown in FIG. 2 is to be processed, a decoding process using QM-Coder is done in correspondence with the image encoding apparatus shown in FIG. 2. Since the sequence for decoding binary symbols in given state (context) S has been explained in detail in ITU-T Recommendation T.81|ISO/IEC10918-1 recommendation, and the like as the international standards for still images, a description thereof will be omitted. At the beginning of decoding of each bit plane, the arithmetic code decoder (not shown) in the bit plane decoder 103 is initialized. Or a termination process of the arithmetic code decoder is done upon completion of decoding. Immediately after the first decoded '1' of each coefficient, the positive/negative sign of that coefficient is decoded.

In step S905, bit plane number n is compared with 0, and if n=0, i.e., if the LSB plane is decoded in step S904, the decoding process of the subband ends; otherwise, the flow returns to step S903.

With the aforementioned processes, bit planes n of subband S are decoded to restore all the coefficients of the subband. By performing the above processes for all the subbands, the coefficients of all the subbands can be restored. The generated coefficients of the subbands are sent to and stored in the coefficient buffer 104.

The Golomb encoder 105 sequentially reads out transform coefficients Q(S, x, y) required to decode an image from its head position line by line from the coefficient buffer 104 to have one line of the subband as a unit, and encodes them by Golomb coding to generate a code sequence. GCS(S, m) represents a Golomb code sequence corresponding to the coefficients of the m-th line of subband S.

Golomb coding takes a non-negative integer as a value to be encoded, and can generate codes corresponding to several kinds of probability distributions by appropriately determining an encoding parameter (to be referred to as a k parameter hereinafter). In this embodiment, a k parameter that can minimize the code length for each line of the coefficients of each subband is selected. After the coefficient Q(S, x, y) is converted into a non-negative integer (V) by:

$$V = \begin{cases} 2 \times Q(S, x, y) & \text{(when } Q(S, x, y) \geq o\text{)} \\ -2 \times Q(S, x, y) - 1 & \text{(when } Q(S, x, y) < 0\text{)} \end{cases}$$

the converted value is encoded by Golomb coding using the selected k parameter.

The selected parameter k is transferred in the code sequence. The sequence for encoding the non-negative integer V to be encoded by Golomb coding using the encoding parameter k is as follows.

V is shifted k bits to the right to obtain an integer m. A code for V is formed by combining "1", which follows m "0"s, and lower k bits of V. FIG. 7 shows an example of Golomb codes when k=0, 1, 2.

Figure 8:
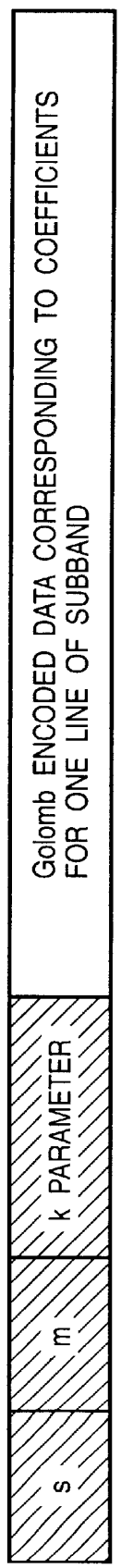
FIG. 8 shows the format of Golomb encoded data output from a Golomb encoder 104.

FIG. 8 shows the structure of a Golomb code sequence GCS(S, m) generated and output by the Golomb encoder 105 for the coefficients of the m-th line of subband S. As can be seen from FIG. 8, the code sequence GCS(S, m) contains an identifier for specifying subband S, line number m, and the selected k parameter.

The communication interface 106 externally outputs various kinds of additional information that pertain to an image such as the numbers of pixels in the horizontal and vertical directions of an image, the quantization step size, and the like, and the code sequences GCS(S, m) output from the Golomb encoder 104 via the communication line. This communication interface comprises an interface to a network such as the Ethernet, analog telephone line, ISDN line, or the like, or an interface to a bus such as SCSI, IDE, ISA, or the like.

Figure 17:
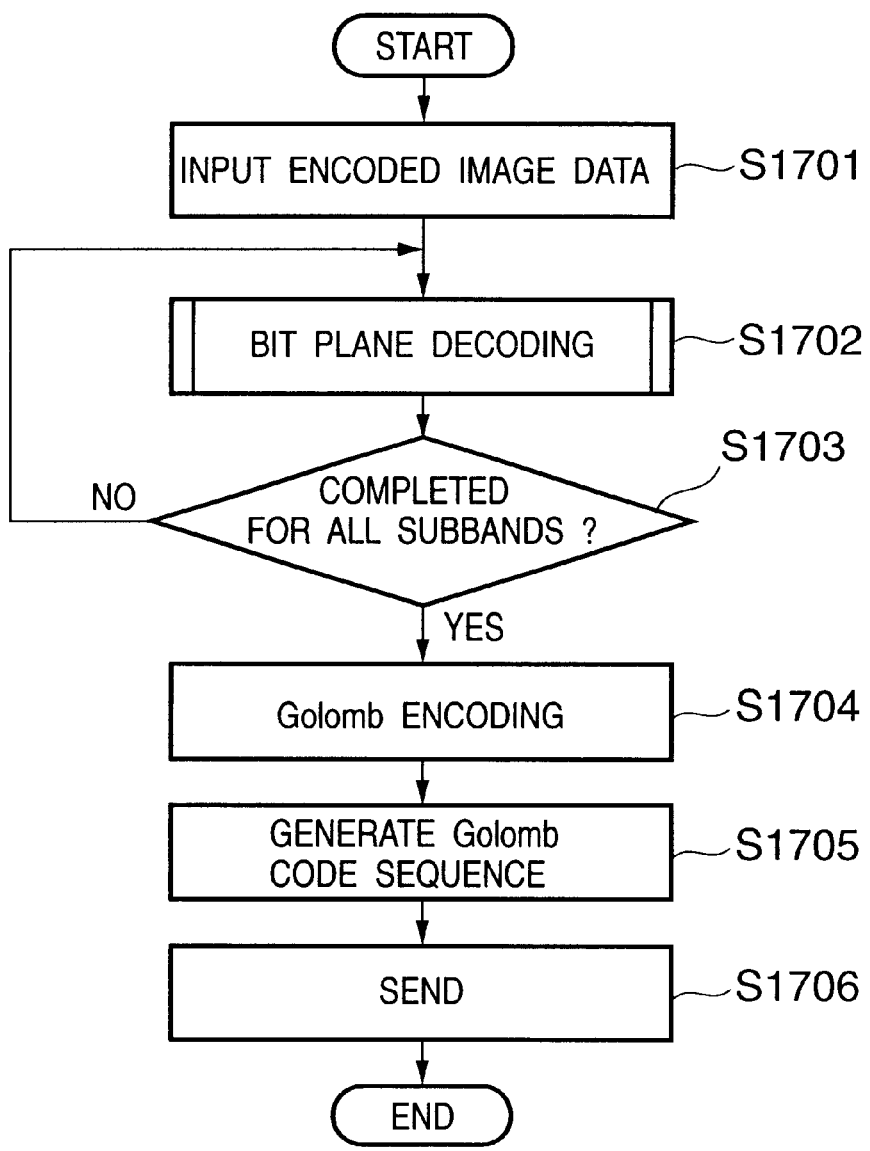
FIG. 17 is a flow chart of a process to be executed by an image processing apparatus 1 in the first embodiment of the present invention.

FIG. 17 is a flow chart showing the process in the image processing apparatus 1. In step S1701, encoded image data is input. In step S1702, bit plane decoding is done. Note that the details of the process in this step are as shown in FIG. 9. The process in step S1702 is repeated for all subbands. Upon completion of bit plane decoding for all the subbands (step S1703), each subband undergoes Golomb coding in step S1704 to generate a Golomb code sequence shown in FIG. 8 in step S1705. The generated Golomb code sequence is sent to the image output apparatus 2 in step S1706.

The communication interface 107 receives the code sequence GCS(S, m) from an external apparatus (image processing apparatus 1) via the communication line, and sends it to the Golomb code decoder 108. This communication interface comprises an interface to a network such as the Ethernet, analog telephone line, ISDN line, or the like, or an interface to a bus such as SCSI, IDE, ISA, or the like.

The Golomb code decoder 108 decodes Golomb encoded data using the encoding parameter k contained in the code sequence GCS(S, m) to decode the coefficient values of the m-th line of subband S.

The Golomb encoded data is decoded in the sequence opposite to encoding. The runlength of "0"s from the beginning of decoding is checked, and is held in integer m. Then, k bits are extracted from a position immediately after "1" that terminates a run of "0"s, m is shifted k bits to the left, and the OR of the shifted m and extracted k bits is computed to decode non-negative integer V. From this non-negative integer V, a coefficient Q(S, x, y) is decoded by:

$$Q(S, x, y) = \begin{cases} -(V + 1)/2 & \text{(when } V \text{ is an odd number)} \\ V/2 & \text{(when } V \text{ is an even number)} \end{cases}$$

The decoded coefficient Q(S, x, y) is sent to the coefficient dequantizer 109. The coefficient dequantizer 109 computes a coefficient C' (S, x, y) from the coefficient Q(S, x, y) decoded by the Golomb code decoder 108 using a quantization step delta(S) determined for each subband, which is sent from the image processing apparatus 1 (as additional information). The dequantization process by the coefficient dequantizer 109 is described by:

$$C'(S, x, y) = Q(S, x, y) \times \text{delta}(S)$$

The coefficient buffer 110 stores coefficients C' (S, x, y) generated by the coefficient dequantizer 109, which are required for the process in the inverse discrete wavelet transformer 111.

After the transform coefficients required for the process are stored in the coefficient buffer 110, the inverse discrete wavelet transformer 111 computes their inverse discrete wavelet transforms to reclaim image data. Two-dimensional inverse discrete wavelet transformation is implemented by applying one-dimensional transformation in the horizontal and vertical directions in an order opposite to the decomposition process shown in FIGS. 4A to 4C. Inverse discrete wavelet transformation for restoring 2N one-dimensional signals x(n) (n=0 to 2N−1) is described by:

$$x(2n) = l(n) - \text{floor}\{(h(n-1) + h(n) + 2)/4\}$$

$$x(2n+1) = h(n) + \text{floor}\{(x(2n) + x(2n+2))/2\}$$

where h(n) is a coefficient of a high-frequency subband, l(n) is a coefficient of a low-frequency subband, and floor{R} is a maximum integer smaller than real number R. Note that the coefficients h(n) are computed within the range of n=0 to floor{N/2} and coefficient l(n) are computed within the range of n=0 to floor{(N+1)/2}. Also, the two ends (n<0 and n≧N) of h(n) and l(n) required in computations of the above equations are calculated in advance by a known method.

The image output unit 112 outputs or displays image data reclaimed by the inverse discrete wavelet transformer 111, and corresponds to an image output engine of a printer, an image display unit of a portable terminal or portable phone, or the like.

Figure 18:
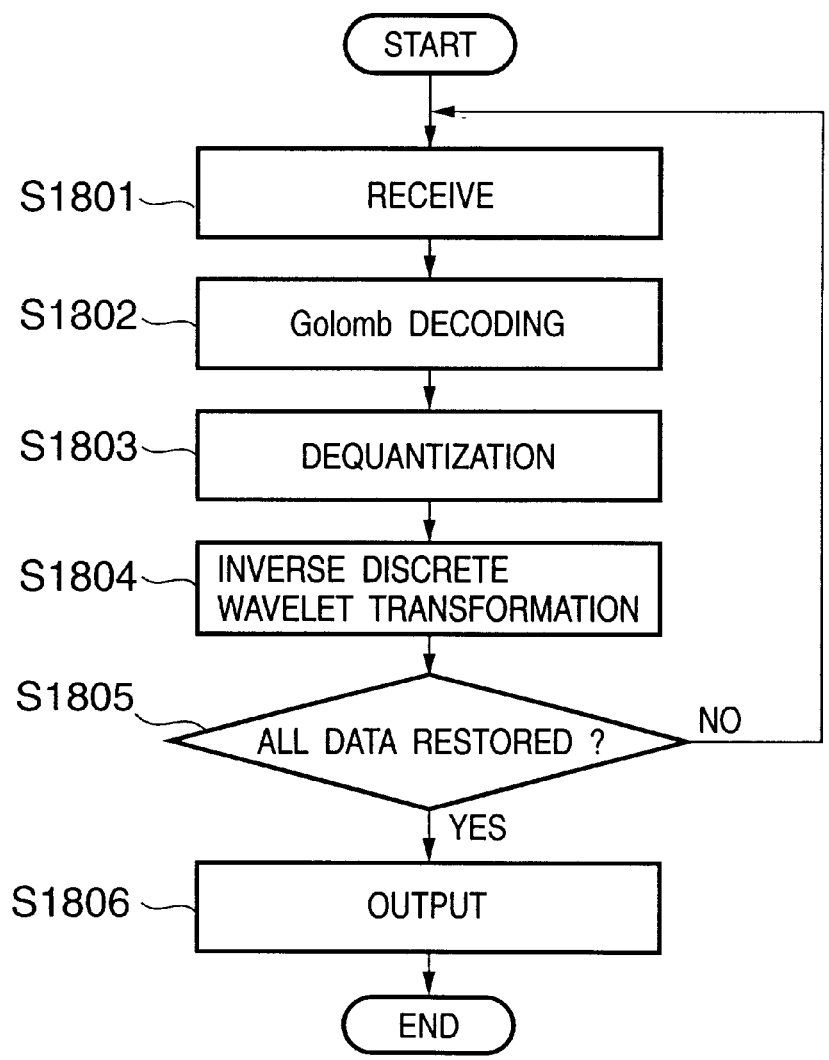
FIG. 18 is a flow chart of a process to be executed by an image output apparatus 2 in the first embodiment of the present invention.

The flow chart of the aforementioned process in the image output apparatus 2 is shown in FIG. 18, and will be described below. In step S1801, the Golomb code sequence sent from the image processing apparatus 1 is received. The received Golomb code sequence undergoes Golomb decoding in step S1802. Upon decoding, parameter k is also read. The Golomb-decoded (quantized) coefficients are dequantized in step S1803, and the restored coefficients undergo inverse discrete wavelet transformation in step S1804. Since an image is reclaimed upon completion of decoding of all Golomb code sequences sent from the image processing apparatus 1 (step S1805), the reclaimed image is output in step S1806.

As described above, the image processing apparatus 1 with high performance decodes predetermined entropy encoded data (decodes arithmetic codes for respective bit planes), and encodes the decoded data by simple entropy coding (Golomb coding). The obtained encoded data is transferred (sent) from the image processing apparatus 1 to the image output apparatus 2 with low performance. The image output apparatus 2 decodes the simple entropy encoded data (decodes Golomb codes) in place of decoding predetermined entropy encoded data, and computes the inverse discrete wavelet transforms to reclaim image data. As a result, efficient decoding that can avoid limitations imposed by the performance of the image output apparatus 2 as much as possible can be realized.

In this embodiment, input encoded image data is quantized by the coefficient quantizer 203. However, the present invention is not limited to this. That is, encoded image data which is not quantized by the coefficient quantizer 203 may be input to the image processing system of this embodiment. In this case, the coefficient dequantizer 109 can be omitted.

[Second Embodiment]

Figure 10:
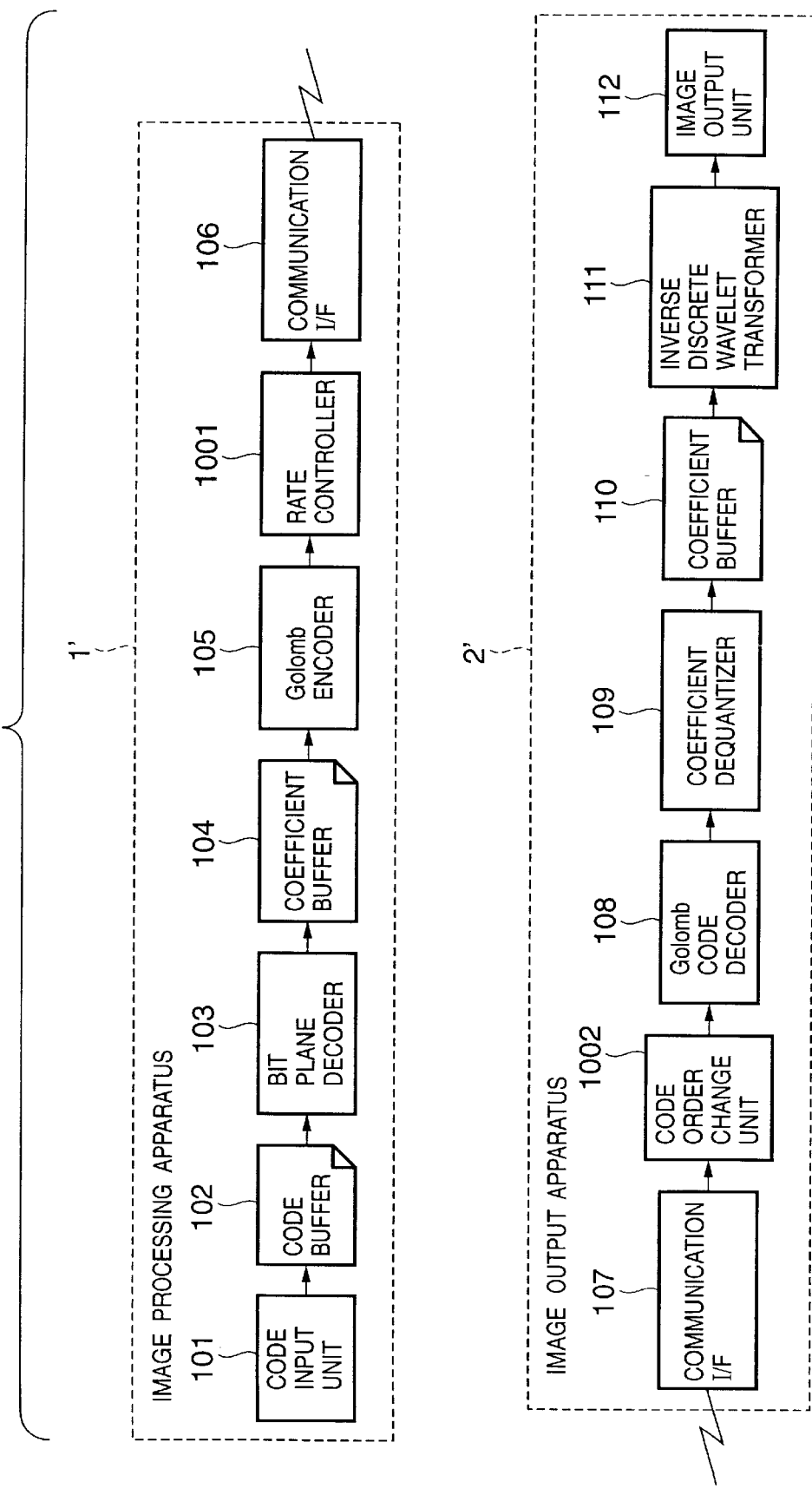
FIG. 10 is a block diagram showing the arrangement of an image processing system according to the second embodiment.

FIG. 10 is a block diagram of an image processing system according to the second embodiment. The same reference numerals in FIG. 10 denote common parts to those in the block diagram of FIG. 1 used in the first embodiment, and a description thereof will be omitted. Referring to FIG. 10, reference numeral 1001 denotes a rate controller; and 1002, a code order change unit.

The operations of the respective units in this embodiment will be described below with reference to FIG. 10. An image processing apparatus 1' and image output apparatus 2' of this embodiment are the same as those in the block diagram in FIG. 1, except that the rate controller 1001 is added to the image processing apparatus 1 in FIG. 1, and the code order change unit 1002 is added to the image output unit 2. Also, the operations from the code input unit 101 to the Golomb encoder 105 are the same as those in the image processing system of the first embodiment. In this embodiment, encoding parameter k to be selected in the Golomb encoder 105 is limited to k≠0.

Figure 11:
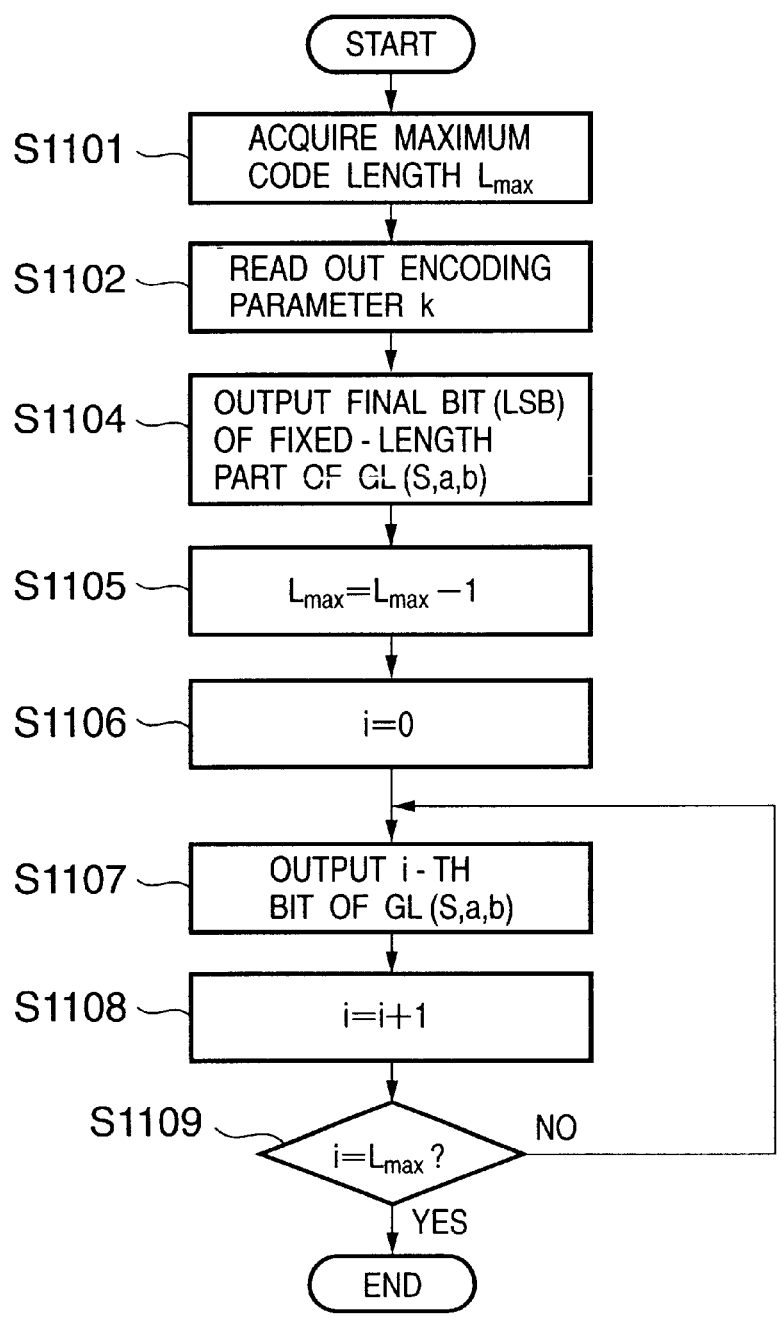
FIG. 11 is a flow chart for explaining the flow of a process in a rate controller 1001.

The rate controller 1001 directly outputs header information of encoded coefficient data for one line of a subband, which are generated by the Golomb encoder 105. The controller 1001 rearranges Golomb encoded data, and controls the rearranged Golomb encoded data to fall within a predetermined code length BL (bytes). Let M be the number of coefficients which belong to one line of subband S of interest, Q(S, a, b) (a=0 to (M−1)) be each coefficient, and GL(S, a, b) be a Golomb code corresponding to each coefficient. FIG. 11 shows the sequence of the process executed by the rate controller 1001.

Referring to FIG. 11, step S1101 is a step of acquiring a maximum code length $L_{max}$ of GL(S, a, b), step S1102 is a step of reading out encoding parameter k, step S1104 is a step of outputting the final bit of the fixed-length part of GL(S, a, b), step S1105 is a step of subtracting 1 from $L_{max}$, step S1106 is a step of substituting 0 in i, step S1107 is a step of outputting the i-th bit of GL(S, a, b), step S1108 is a step of adding 1 to i, and step S1109 is a step of comparing i with $L_{max}$. Although not shown in FIG. 11, when the number of output bits has reached BL bytes (BL×8 bits) in the processes in steps S1104 and S1107, the process ends.

In step S1101, codes GL(S, a, b) (a=0 to (M−1)) which form Golomb encoded data GCS(S, m) of the coefficients of the m-th line of subband S of interest are scanned to obtain a maximum code length $L_{max}$ (bits).

In step S1102, encoding parameter k is read out from data stored in the format shown in FIG. 8.

In step S1104, the final bits (LSBs) of fixed-length parts of codes GL(S, a, b) (a=0 to (M−1)) are output. In step S1105, 1 is subtracted from $L_{max}$. In step S1106, 0 is substituted in i. In step S1107, the i-th bits of codes GL(S, a, b) (a=0 to (M−1)) are output. As exemplified in FIG. 12, variable-length parts of codes GL(S, a, b) are left-aligned, and fixed-length parts are right-aligned to adjust bit positions to maximum code length $L_{max}$. No value is output for a blank bit in the variable-length part. In step S1108, 1 is added to i. In step S1109, i is compared with $L_{max}$, and if i≠$L_{max}$, the flow returns to step S1107; if i=$L_{max}$, the process ends.

Figure 13:
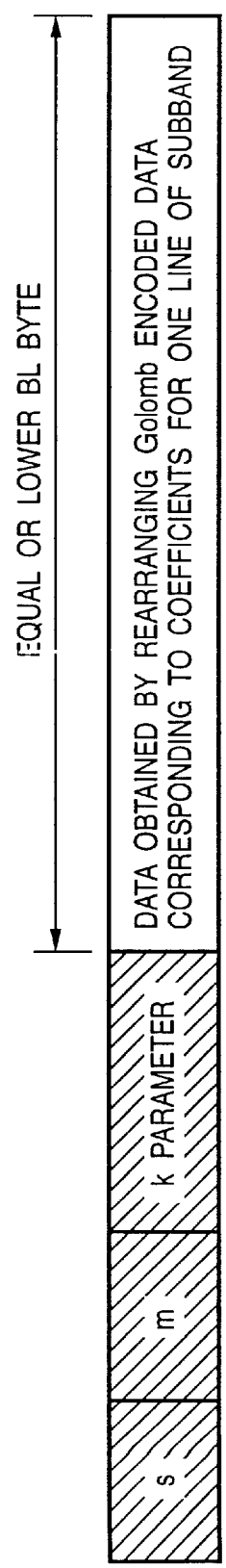
FIG. 13 shows the format of Golomb encoded data output from the rate controller 1001.

With the above process, the length-limited encoded data can be generated, as shown in FIG. 13.

The encoded data generated by the rate controller 1101 is sent to the image output apparatus 2' via the communication interface 106, communication path, and communication interface 107, as has been explained in the first embodiment.

In the flow chart of the process of the image processing apparatus 1' of this embodiment, the processes shown in FIG. 11 are repeated for all the lines of all the subbands between steps S1705 and S1706 in FIG. 17.

Figure 14:
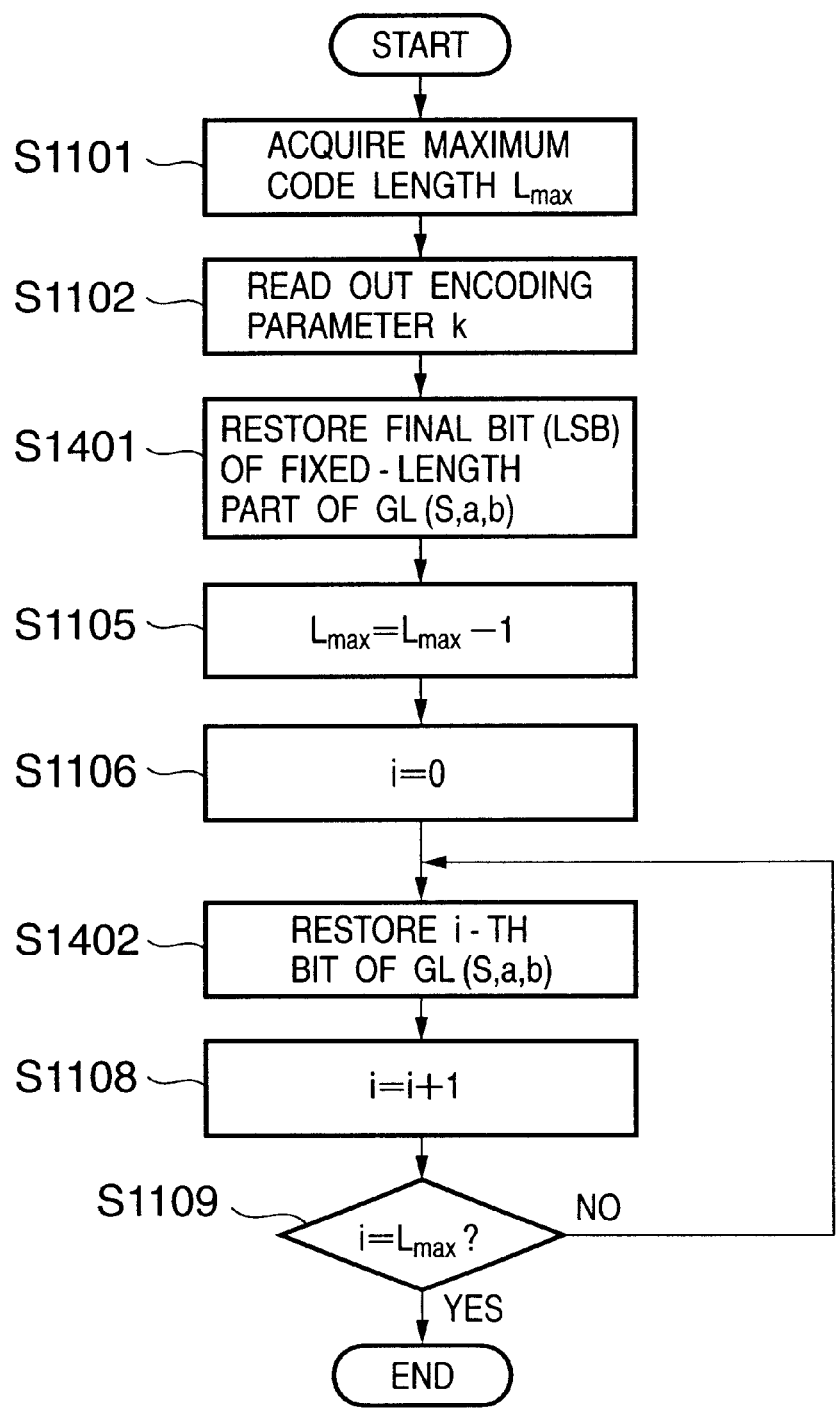
FIG. 14 is a flow chart for explaining the flow of a process in a code order change unit 1002.

In the image output apparatus 2', the code order change unit 1002 rearranges the arrangement of bits changed by the rate controller 1001 to restore original Golomb encoded data. FIG. 14 shows the sequence of the process in the code order change unit 1002. The same step numbers denote steps common to those in FIG. 11, and a description thereof will be omitted. Referring to FIG. 14, step S1401 is a step of restoring the final bits of the fixed-length parts of codes GL(S, a, b), and step S1402 restores the i-th bits of codes GL(S, a, b). Although not shown in FIG. 14, when the number of input bits has reached BL bytes (BL×8 bits) in the processes in steps S1401 and S1402, deficient codes are compensated by a method to be described later, and the process ends.

In step S1401, bits are arranged in turn in the final bits (LSBs) of the fixed-length parts of codes GL(S, a, b) (a=0 to (M−1)) to restore LSBs.

In step S1402, bits are arranged at the i-th bits of codes GL(S, a, b) (a=0 to (M−1)) to restore data. As exemplified in FIG. 12, variable-length parts of codes GL(S, a, b) are left-aligned, and fixed-length parts are right-aligned to adjust bit positions to maximum code length $L_{max}$. A position of the variable-length part where a bit "1" has already been restored is skipped.

Figure 15:
FIG. 15 shows the processes for compensating incomplete Golomb codes by the code order change unit 1002.

Upon completion of the process, incomplete parts of Golomb codes are compensated. More specifically, if a variable-length part does not terminate with 1, 1 is appended; if a fixed-length part is smaller than k bits, "0"s are stuffed. FIG. 15 shows an example wherein incomplete codes are compensated for required bits.

Since the processes after the Golomb code decoder 108 are the same as those in the image processing system in the first embodiment, a description thereof will be omitted.

In the flow chart of the process in the image output apparatus 2' in this embodiment, the processes shown in FIG. 14 are done for all input codes GL(S, a, b) between steps S1801 and S1802 in the flow chart in FIG. 18.

As described above, the image processing apparatus 1' with high performance decodes predetermined entropy encoded data (decodes arithmetic codes for respective bit planes), and encodes the decoded data by simple entropy coding (Golomb coding). The obtained encoded data is transferred (sent) from the image processing apparatus 1' to the image output apparatus 2' with low performance. The image output apparatus 2' decodes the simple entropy encoded data (decodes Golomb codes) in place of decoding predetermined entropy encoded data, and computes the inverse discrete wavelet transforms to reclaim image data. As a result, efficient decoding that can avoid limitations imposed by the performance of the image output apparatus 2' as much as possible can be realized. Especially, in this embodiment, since the size of code to be generated is limited after simple entropy encoding, a decoding process can be done in correspondence with the bandwidth of a transmission path and the memory size of the image output apparatus 2'.

In this embodiment, input encoded image data is quantized by the coefficient quantizer 203. However, the present invention is not limited to this. That is, encoded image data which is not quantized by the coefficient quantizer 203 may be input to the image processing system of this embodiment. In this case, the coefficient dequantizer 109 can be omitted.

[Third Embodiment]

Figure 16:
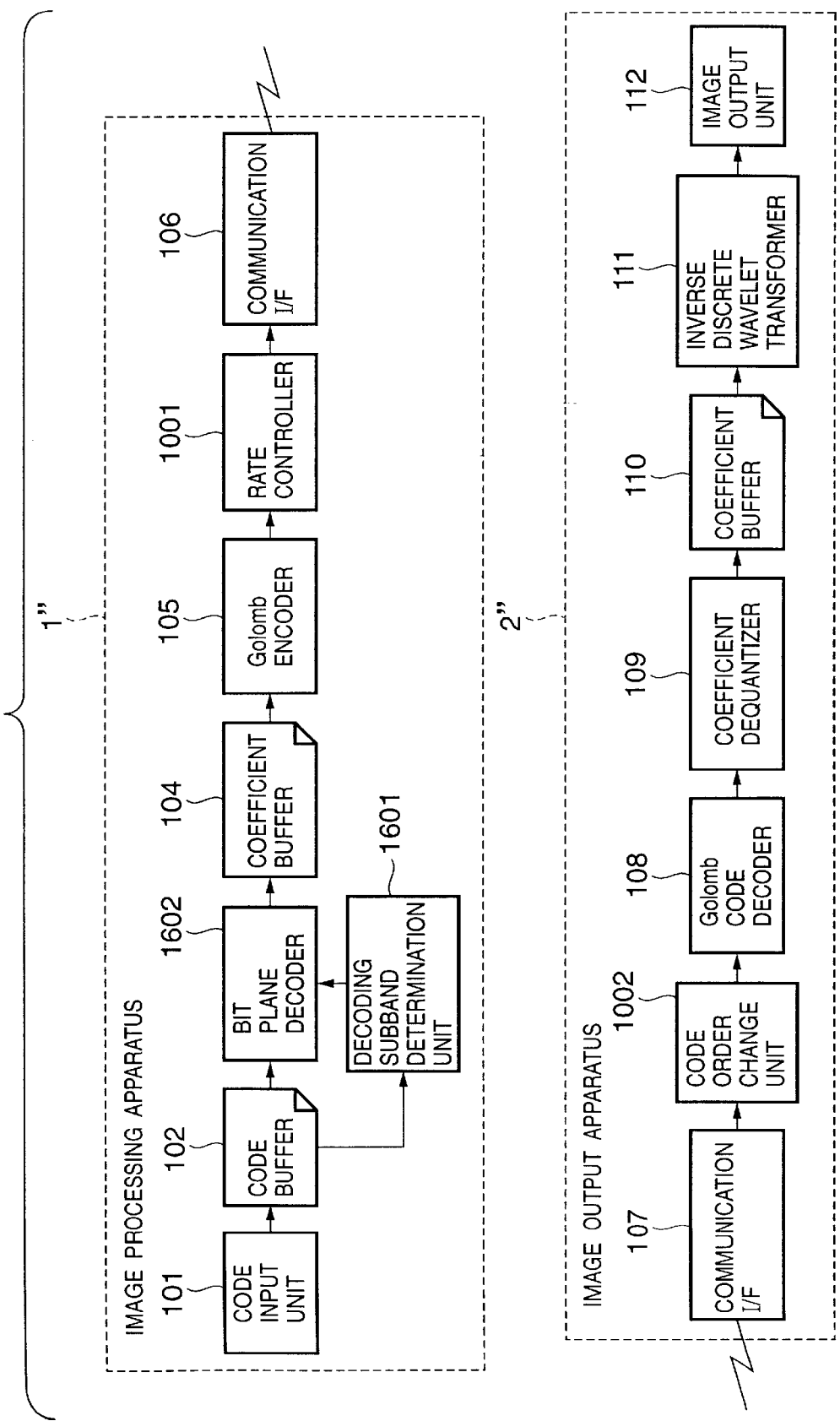
FIG. 16 is a block diagram showing the arrangement of an image processing system according to the third embodiment.

FIG. 16 is a block diagram showing an image processing system according to the third embodiment. The same reference numerals in FIG. 16 denote parts common to those in the block diagrams in FIGS. 1 and 10 used in the respective first and second embodiments, and a detailed description thereof will be omitted. Referring to FIG. 16, reference numeral 1601 denotes a decoding subband determination unit; and 1602, a bit plane decoder. As can be seen from FIG. 16, the system of this embodiment has substantially the same arrangement as that of the image processing system of the second embodiment, except that the decoding subband determination unit 1601 is added to the image processing apparatus 1' of the image processing system of the second embodiment.

The process in the decoding subband determination unit 1601 as a difference from the second embodiment will be explained below. The decoding subband determination unit 1601 holds the maximum number $XO_{max}$ of pixels in the horizontal direction, and the maximum number $YO_{max}$ of pixels in the vertical direction the image output apparatus 2' can output. The header of encoded data stored in the code buffer 102 is analyzed to obtain the numbers X and Y of pixels in the horizontal and vertical directions of image data to be decoded. If X and Y are respectively equal to or smaller than $XO_{max}$ and $XO_{max}$, the output apparatus can output if all the subbands are decoded. Hence, all subbands LL, LH1, HL1, HH1, LH2, HL2, and HH2 are set to be subbands to be decoded. On the other hand, if one of X and Y is larger than $XO_{max}$ or $XO_{max}$, and X/2 and Y/2 are respectively equal to or smaller than $XO_{max}$ and $XO_{max}$, only four subbands LL, LH1, HL1, and HH1 are set to be subbands to be decoded. In all other cases, a subband LL alone is set to be a subband to be decoded.

The bit plane decoder 1602 decodes the subbands to be decoded, which are set by the decoding subband determination unit 1601, of the seven subbands LL, LH1, HL1, HH1, LH2, HL2, and HH2, in turn from the upper to the lower bit planes, so as to restore and output the coefficients of the subbands. The sequence for restoring the coefficients of each subband is the same as that in the bit plane decoder of the first embodiment. Note that the operations of other blocks are as has been described in the second embodiment.

As described above, an image processing apparatus 1" with high performance decodes predetermined entropy encoded data (decodes arithmetic codes for respective bit planes), and encodes the decoded data by simple entropy coding (Golomb coding). The obtained encoded data is transferred (sent) from the image processing apparatus 1" to the image output apparatus 2' with low performance. The image output apparatus 2' decodes the simple entropy encoded data (decodes Golomb codes) in place of decoding predetermined entropy encoded data, and computes the inverse discrete wavelet transforms to reclaim image data. As a result, efficient decoding that can avoid limitations imposed by the performance of the image output apparatus 2' as much as possible can be realized. Especially, in this embodiment, since subbands to be decoded are selected in correspondence with the output range of the image output apparatus 2', idle code transfer between the image processing apparatus 1" and image output apparatus 2' can be avoided.

In this embodiment, the input encoded image data is quantized by the coefficient quantizer 203. However, the present invention is not limited to this. That is, encoded image data which is not quantized by the coefficient quantizer 203 may be input to the image processing system of this embodiment. In this case, the coefficient dequantizer 109 can be omitted.

[Fourth Embodiment]

Figure 19:
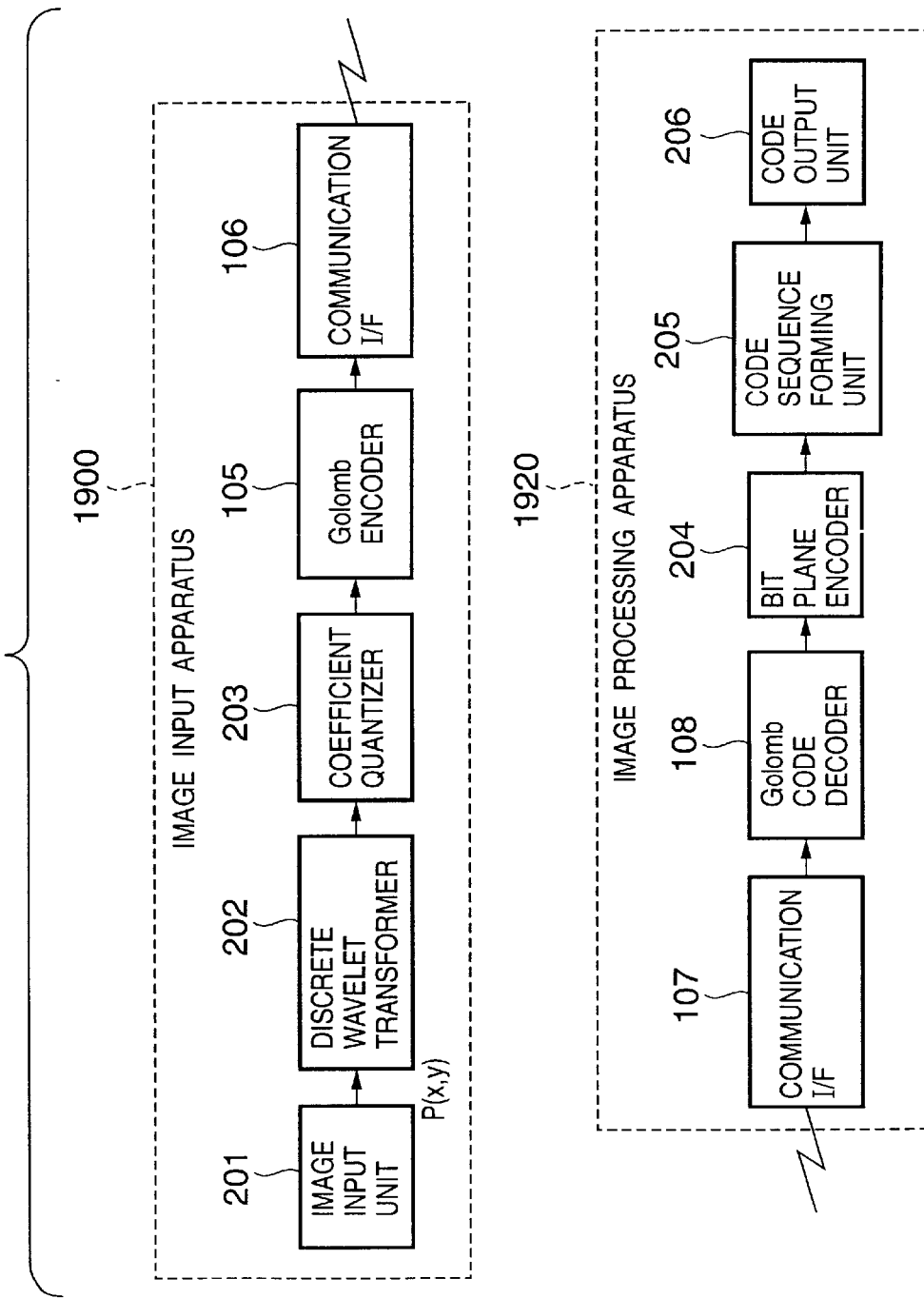
FIG. 19 is a block diagram showing the arrangement of an image processing system according to the fourth embodiment.

This embodiment will explain an image processing system (image encoding apparatus) which comprises an apparatus for inputting an image (image input apparatus), and an apparatus for encoding the image input by the image input apparatus (image processing apparatus). FIG. 19 is a block diagram showing the arrangement of the image processing system of this embodiment. The same reference numerals in FIG. 19 denote the same parts as in FIGS. 1 and 2, and a description thereof will be omitted.

Referring to FIG. 19, the image processing system of this embodiment comprises two apparatuses, i.e., an image input apparatus 1900 with limited arithmetic performance and memory size, and an image processing apparatus 1920 which has a larger memory size and higher arithmetic performance than the image input apparatus 1900. A method and system operations that can avoid limitations imposed by the apparatus performance of the apparatus 1900 as much as possible upon encoding an image input by the image input apparatus 1900 by the image processing system comprising these two apparatuses will be explained below.

As the image input apparatus 1900, for example, a scanner, digital camera, or the like is assumed, and the apparatus 1900 includes an image sensing device such as a CCD or the like, and various image adjustment circuits which implement correction processes such as gamma correction, shading correction, and the like.

On the other hand, as the image processing apparatus 1920, a recent personal computer or versatile computer, dedicated apparatus, image processing board, or the like is assumed.

When an image is input to the image input unit 201, coefficients Q(S, x, y) of respective subbands are obtained via the discrete wavelet transformer 202 and coefficient quantizer 203, as described above. After that, as in the first embodiment, the Golomb encoder 105 encodes the coefficients Q(S, x, y) by Golomb coding, and code sequences GCS(S, m) are output via the communication interface 106 to an external apparatus (the image processing apparatus 1920 in this embodiment) (via a communication line).

On the other hand, the Golomb code decoder 108 decodes coefficient values of the m-th line of subband S, as described above, on the basis of the code sequences GCS(S, m) input to the image processing apparatus 1920 via the communication interface 107. The bit plane encoder 204 encodes the decoded coefficients Q(S, x, y) by bit plane coding (arithmetic coding for respective bit planes), and the code sequence forming unit 205 generates a code sequence, as described above. The generated code sequence is externally output via the code output unit 206.

As described above, the image input apparatus 1900 with low performance executes simple entropy encoding (Golomb encoding) in place of predetermined entropy encoding (arithmetic coding for respective bit planes) to be originally done, after discrete wavelet transformation and quantization. The obtained encoded data is transferred (sent) to the image processing apparatus 1920 with high performance. The image processing apparatus 1920 decodes the transferred Golomb encoded data, executes the predetermined encoding (bit plane encoding), and forms a final encoded data sequence. As a result, efficient encoding that can avoid limitations imposed by the apparatus performance of the image input apparatus 1900 as much as possible can be realized.

Also, the transform coefficients generated by the discrete wavelet transformer 202 need not always be quantized by the coefficient quantizer 203. The same applies to the following embodiments.

[Fifth Embodiment]

Figure 20:
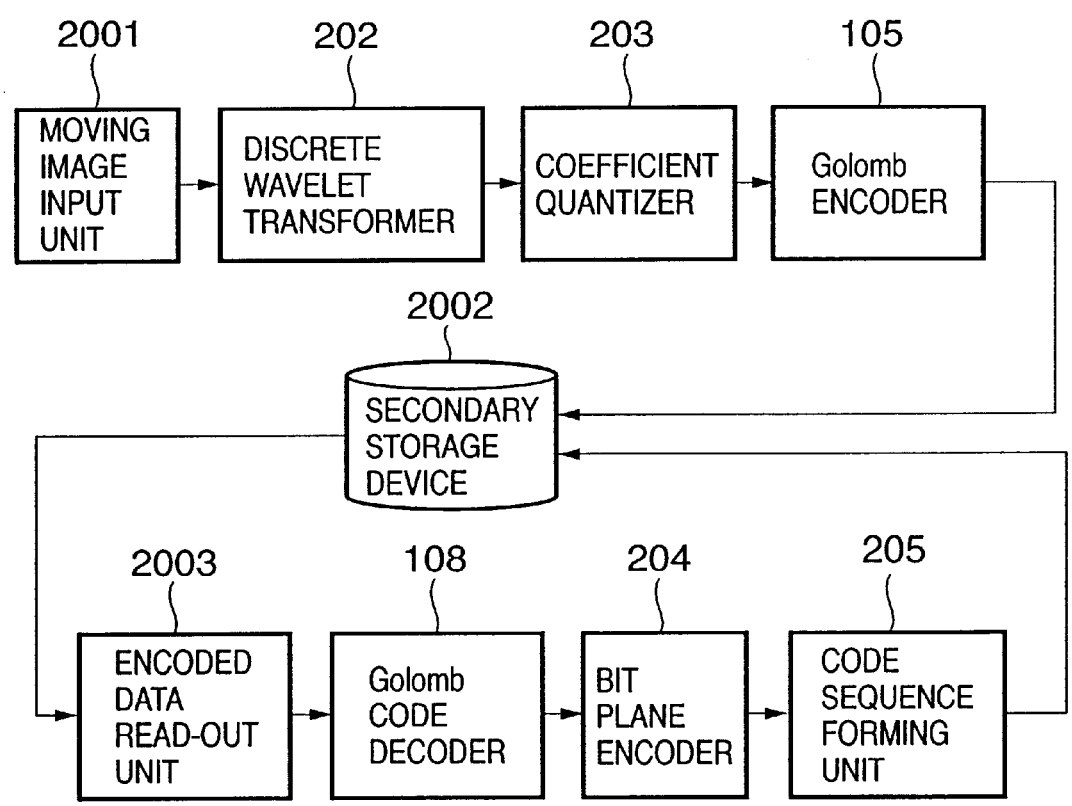
FIG. 20 is a block diagram showing the arrangement of an image processing system according to the fifth embodiment.

FIG. 20 is a block diagram showing the arrangement of an image processing system of this embodiment. The same reference numerals in FIG. 20 denote the same parts as in FIGS. 1 and 2, and a description thereof will be omitted.

Referring to FIG. 20, reference numeral 2001 denotes a moving image input unit; 2002, a secondary storage device; and 2003, an encoded data read-out unit.

In the description of this embodiment, assume that monochrome moving image data (the luminance value of one pixel is represented by 8 bits) is captured at a rate of 15 frames/sec, and moving image data for 4 sec, i.e., 60 frames, is encoded. However, the present invention is not limited to such specific embodiment, and the capture time, and the number of frames to be captured per second can be modified. As in the above embodiments, this embodiment can encode various image data.

The operations of the respective units of the image processing system of this embodiment will be described in detail below using the block diagram of FIG. 20. The image processing system of this embodiment encodes moving image data, which is input from the moving image input unit 2001 at a rate of 15 frames/sec, in real time using simple entropy coding. After the encoded data is stored in the secondary storage device 2002, the encoded data is re-compressed using bit plane coding (arithmetic coding for respective bit planes).

The image processing system of this embodiment is substantially the same as the system described in the fourth embodiment, except that an image to be encoded is a moving image, the secondary storage device 2002 is arranged in place of the communication interfaces 106 and 107, and encoded data is stored in this secondary storage device 2002.

As described above, the moving image input unit 2001 inputs a moving image for four sec (60 frames) at a rate of 15 frames/sec. The moving image input unit 2001 sends the input image to the discrete wavelet transformer 202 frame by frame.

One frame, i.e., one image data sent to the discrete wavelet transformer 202 undergoes discrete wavelet transformation by the discrete wavelet transformer 202, is quantized by the coefficient quantizer 203, and is encoded by the Golomb encoder 105 by entropy encoding, as in the fourth embodiment.

Code sequences GCS(S, m) generated by the Golomb encoder 105 are temporarily stored in the secondary storage device 2002. At this time, the code sequences GCS(S, m) are stored together in units of frames.

Upon completion of encoding of all image data for 60 frames input from the moving image input unit 2001, the encoded data read-out unit 2003 reads out the encoded data for each frame from the first to the end frames from the secondary storage device 2002, and passes them to the Golomb code decoder 108.

As in the fourth embodiment, the Golomb code decoder 108 restores coefficients Q(S, x, y) from the code sequences GCS(S, m). The bit plane encoder 204 encodes Q(S, x, y) for respective subbands by bit plane coding, and generates and outputs bit plane encoded data. Furthermore, the code sequence forming unit 205 generates a final code sequence by rearranging the code sequences for respective frames, and stores it in the secondary storage device 2002.

With the aforementioned process, moving image data input from the moving image input unit is encoded by simple entropy encoding for respective frames, and encoded data is stored in the secondary storage device. After the stored encoded data is decoded, the decoded data is encoded by bit plane coding again, thus encoded moving image data which is highly compressed and suitable for scalable transfer, while maintaining processing speed upon capturing encoded data to the secondary storage device, can be generated.

[Sixth Embodiment]

In the fourth and fifth embodiments, a final code sequence is formed to gradually improve spatial resolution (or to increase the decoded image size) upon transferring the code sequence.

Figure 21:
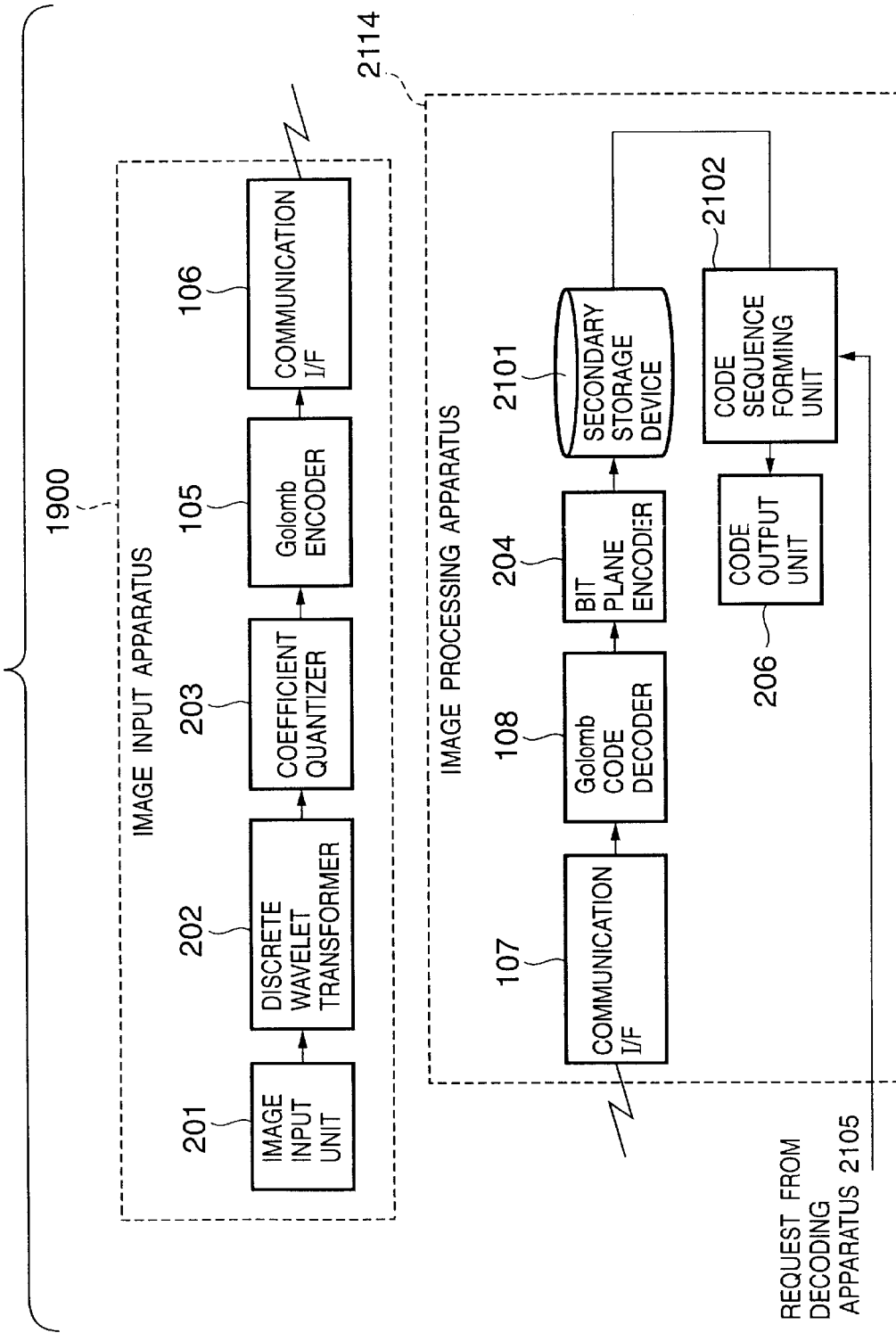
FIG. 21 is a block diagram showing the arrangement of an image processing system according to the sixth embodiment.

In this embodiment, as shown in FIG. 21, a request from a decoding apparatus 2105, which is different from the image input apparatus 1900 and an image processing apparatus 2114, is input to a code sequence forming unit 2102. A code sequence that gradually improves spatial resolution (to be referred to as spatial resolution scalable hereinafter) as in the above embodiment, and a code sequence that gradually improves image quality (to be referred to as SNR scalable hereinafter) are selectively output in accordance with the request input from the decoding apparatus 2105.

FIG. 21 is a block diagram showing the arrangement of an image processing system according to this embodiment. The same reference numerals in FIG. 21 denote parts common to the block diagrams in FIGS. 1, 2, and 19, and a description thereof will be omitted.

Referring to FIG. 21, reference numeral 2101 denotes a secondary storage device; and 2102, a code sequence forming unit. The image processing apparatus 2114 has an arrangement in which the secondary storage device 2101 is added to the image processing apparatus 1920 in FIG. 19, and the code sequence forming unit 2102 is arranged in place of the code sequence forming unit 205. That is, the image processing apparatus 2114 is modified to input the request from the decoding apparatus 2105 to the code sequence forming unit 2102.

The image processing system of this embodiment encodes a large number of image data, and stores bit plane encoded data output from the bit plane encoder 204 in the secondary storage device 2101. Then, a code sequence to be output is generated in accordance with scalability corresponding to the request from the decoding apparatus 2105.

The operation of the image input apparatus 1900 is the same as that in the fourth embodiment, and a description thereof will be omitted. The operation of the image processing apparatus 2114 will be explained below.

As in the image processing apparatus 1920 in the image processing system of the fourth embodiment, the Golomb code decoder 108 restores coefficients Q(S, x, y) from code sequences GCS(S, m), and the bit plane encoder 204 encodes the coefficients Q(S, x, y) for respective subbands by bit plane coding (arithmetic coding for respective bit planes), thus generating and outputting bit plane encoded data.

The bit plane encoded data output from the bit plane encoder 204 are temporarily stored in the secondary storage device 2101. At this time, the bit plane encoded data are stored together in units of images.

A pair of an image identification signal i that designates an image the decoding apparatus 2105 requires of the plurality of encoded image data stored in the secondary storage device 2101, and a scalability select signal s that designates spatial resolution or SNR scalable are sent as a request signal from the decoding apparatus 2105 to the code sequence forming unit 2102.

The image identification signal i is not particularly limited, and can be an image name, image serial number, or the like, as long as it can uniquely designate an image. The scalability select signal s is 0 if spatial resolution scalable is designated; it is 1 if SNR scalable is designated.

The code sequence forming unit 2102 reads out, from the secondary storage device 2102, bit plane encoded data associated with image data designated by the request signal (i, s) sent from the decoding apparatus 2105, and generates and outputs a code sequence with the designated scalability. If the scalability select signal s is 0, encoded data with the structure shown in FIG. 3, which includes a header and three levels, i.e., levels 0, 1, and 2, is generated, as in the image processing system of the first embodiment.

Figure 22:
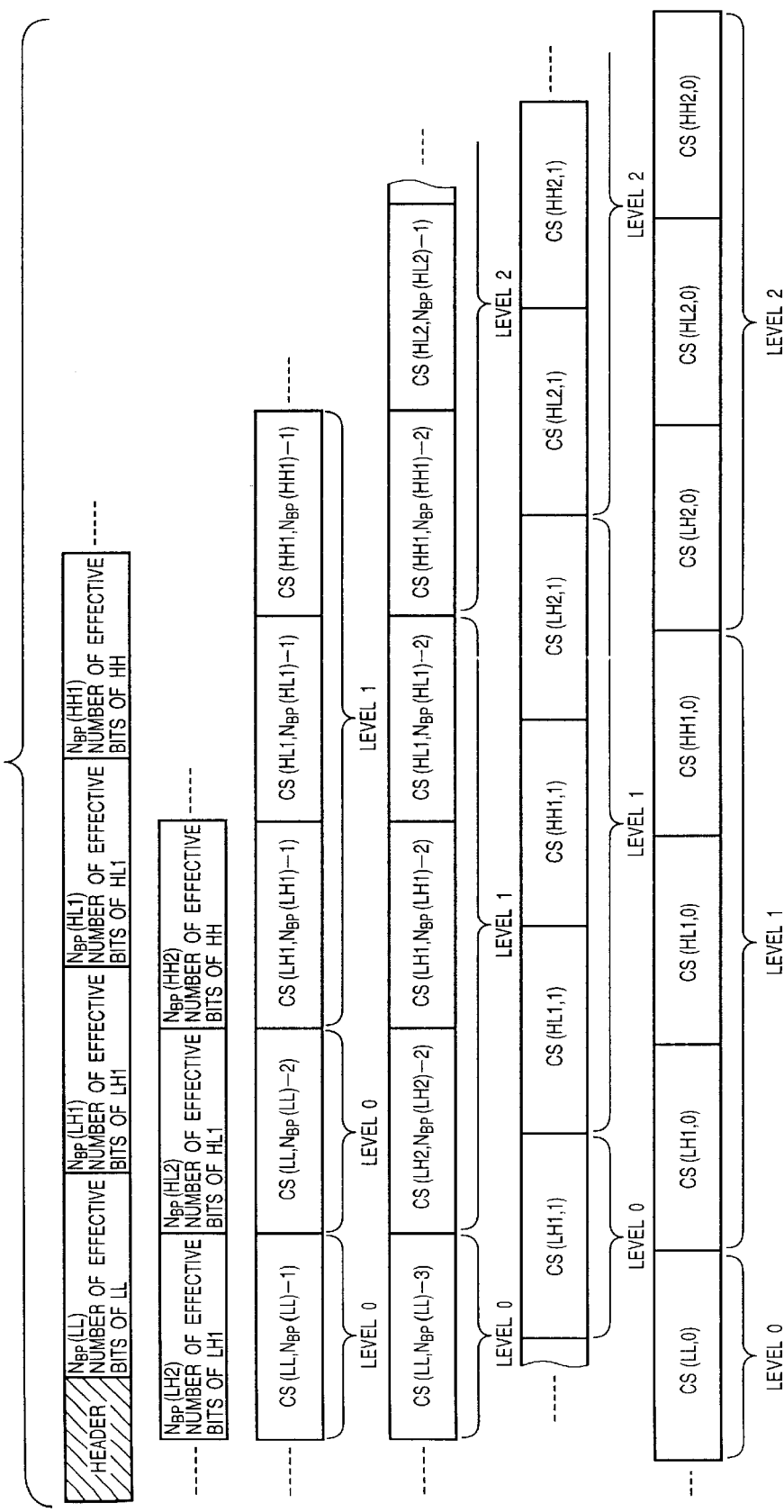
FIG. 22 shows the format of a code sequence generated to implement SNR scalability.

On the other hand, if the scalability select signal s is 1, encoded data is formed by repetitively arranging encoded data of respective bit planes from the MSB side in the order of levels 0, 1, and 2, as shown in FIG. 22.

The encoded data generated by the code sequence forming unit 2102 is output to the decoding apparatus 2105 via the code output unit 206. The code output unit 206 can be applied to a storage device such as a hard disk, memory, or the like, an interface for a network line, or the like.

With the aforementioned process, according to this embodiment, a code sequence can be flexibly formed in accordance with the request from the decoding apparatus 2105, in addition to the effects of the fourth embodiment.

In the code sequence forming unit 2102 of this embodiment, as a method of forming a code sequence that gradually improves image quality as code transfer progresses (SNR scalable), a method of arranging bit plane encoded data of respective levels for respective bit planes in turn from the MSB side has been explained. However, an efficient transfer order may be obtained in consideration of the code size of each bit plane data and image quality improvement effect, and bit plane encoded data may be arranged in this order.

[Modification]

The present invention is not limited to the aforementioned embodiments. For example, the above embodiments have exemplified decoding (encoding) using discrete wavelet transformation. The discrete wavelet transformation is not limited to that used in the above embodiment, and the filter type and application method may be changed. For example, a filter having a larger number of taps such as a 9/7 filter or the like may be used instead. Also, the number of times of application of transformation may be changed. Furthermore, two-dimensional discrete wavelet transformation may be repeated for subbands other than the low-frequency subband. Moreover, the present invention is not limited to discrete wavelet transform, and other coding methods based on sequence transformation methods such as DCT, Hadamard transformation, and the like may be used as long as they are suitable for hierarchically encoding image data. In addition, the coefficient coding method is not limited to the above embodiments. For example, arithmetic coding methods such as MQ-Coder and the like other than QM-Coder may be used, and other entropy coding methods may be used.

In the above embodiments, Golomb coding is used as simple entropy coding. Alternatively, coding schemes such as Huffman coding and the like may be used in place of Golomb coding.

In the above embodiments, quantization is used. The scope of the present invention also includes a case of irreversible coding or the like, that does not use quantization.

In the above embodiments, bit plane encoding in units of subbands has been explained for the sake of simplicity. Alternatively, each subband may be broken up into small blocks, and bit plane coding may be applied to each small block so as to allow easy random access. Also, bit planes may be categorized into a plurality of sub bit planes in accordance with neighboring coefficients of the coefficient of interest, and may be encoded in a plurality of passes.

The image processing system of each of the above embodiments has exemplified decoding of code sequences arranged in the order of spatial resolutions. Alternatively, the present invention may be applied to decoding of encoded data formed by a method of forming a code sequence which gradually improves image quality as code transfer progresses (SNR scalable).

Image data may be broken up into a plurality of tiles, and an encoding process may be done for respective tiles.

Note that the present invention may be applied to a part of either a system constituted by a plurality of devices (e.g., a host computer, interface device, reader, printer, and the like), or an apparatus consisting of a single equipment (e.g., a copying machine, facsimile apparatus, digital camera, or the like). That is, in the first to third embodiments, the image processing apparatus and image output apparatus have been explained as independent apparatuses, but they may form a single apparatus. Likewise, in the fourth to sixth embodiments, the image input apparatus and image processing apparatus have been explained as independent apparatuses, but they may form a single apparatus.

The present invention is not limited to the apparatus and method for implementing the above embodiments, but its scope includes a case wherein the above embodiments are achieved by supplying a program code of software that can implement the above embodiments to a computer (CPU or MPU) in the system or apparatus, and controlling to operate various devices by the computer of the system or apparatus in accordance with the program code.

In this case, the program code itself of software implements the functions of the above embodiments, and the program code itself, and means for supplying the program code to the computer (e.g., a storage medium which stores the program code) are included in the scope of the present invention.

As the storage medium for storing the program code, for example, a floppy disk, hard disk, optical disk, magneto-optical disk, CD-ROM, magnetic tape, nonvolatile memory card, ROM, and the like may be used.

Not only when the functions of the above embodiment are implemented by controlling various devices by the computer in accordance with the supplied program alone but also when the functions of the above embodiment are implemented by collaboration of the program code and an OS (operating system) running on the computer, another application software, or the like, such program code is included in the scope of the present invention.

Furthermore, when the supplied program code is stored in a memory equipped on a function extension board of the computer or a function extension unit connected to the computer, a CPU or the like equipped on the function extension board or unit executes some or all of actual processes on the basis of the instruction of that program code, and the functions of the above embodiment are implemented by those processes, such case is also included in the scope of the present invention.

When the present invention is applied to the storage medium, that storage medium stores program codes corresponding to the aforementioned flow chart(s) (shown in FIG. 17 and/or FIG. 18).

As described above, according to the present invention, even when the processing time, memory, arithmetic cost, and the like of the apparatus are limited, encoding/decoding can be efficiently done.

As many apparently widely different embodiments of the present invention can be made without departing from the spirit and scope thereof, it is to be understood that the invention is not limited to the specific embodiments thereof except as defined in the appended claims.

What is claimed is:

1. An image processing system comprising an image processing apparatus and an image output apparatus, said image processing apparatus comprising:

first input means for inputting encoded image data encoded using first entropy coding;

first decoding means for obtaining transform coefficients or quantization values of the transform coefficients by decoding said encoded image data;

encoding means for generating encoded data by encoding the transform coefficients or the quantization values of the transform coefficients obtained by said first decoding means using second entropy coding different from the first entropy coding, and generating a code sequence containing the encoded data; and output means for outputting the code sequence generated by said encoding means to said image output apparatus, and said image output apparatus comprising:

second input means for inputting the code sequence output from said output means;

second decoding means for entropy-decoding the encoded data contained in the code sequence to obtain the transform coefficients or the quantization values of the transform coefficients; and image reconstruction means for reconstructing an image on the basis of the transform coefficients or the quantization values of the transform coefficients.

2. The system according to claim 1, wherein the first entropy coding is arithmetic coding, and said first decoding means restores the transform coefficients or the quantization values of the transform coefficients from arithmetic encoded data for respective bit planes.

3. The system according to claim 2, wherein said first decoding means decodes bit planes from the MSB side to the LSB side for respective subbands contained in the encoded image data.

4. The system according to claim 1, wherein the second entropy coding is Golomb coding, and said encoding means encodes one line of a subband as a unit by Golomb coding.

5. The system according to claim 1, wherein said output means outputs the code sequence via a communication line.

6. The system according to claim 5, wherein said output means further outputs various kinds of additional information including the numbers of pixels in horizontal and vertical directions of an image, a quantization step size, and the like.

7. The system according to claim 1, wherein the code sequence contains a parameter used in Golomb coding.

8. The system according to claim 1, wherein said second decoding means decodes the encoded data by Golomb coding.

9. The system according to claim 1, wherein when said second decoding means obtains the transform coefficients, said image reconstruction means computes inverse discrete wavelet transforms of the transform coefficients, and when said second decoding means obtains the quantization values of the transform coefficients, said image reconstruction means obtains the transform coefficients by dequantizing the quantization values of the transform coefficients, and computes inverse discrete wavelet transforms of the transform coefficients.

10. The system according to claim 1, wherein said image processing apparatus further comprises:

code length control means for controlling a code length of the encoded data generated by said encoding means, and said image output apparatus further comprises:

code sequence restoration means for restoring the encoded data generated by said encoding means on the basis of the encoded data, the code length of which is controlled by said code length control means.

11. The system according to claim 10, wherein said code length control means adjusts the code length of the encoded data generated by said encoding means to a largest code length of encoded in one line in a subband.

12. The system according to claim 1, wherein said image processing apparatus further comprises:

setting means for setting encoded image data to be decoded by said first decoding means in correspondence with an image size said image output apparatus can output.

13. The system according to claim 12, wherein said setting means sets a subband to be decoded by said first decoding means in accordance with the image size.

14. The system according to claim 12, wherein the image size said image output apparatus can output is defined by the maximum number of pixels in a horizontal direction and the maximum number of pixels in a vertical direction.

15. An image processing system comprising an image input apparatus and an image processing apparatus, said image input apparatus comprising:

first input means for inputting an image;

frequency component transformation means for computing frequency component of the image to obtain transform coefficients or quantization values of the transform coefficients;

first entropy encoding means for encoding the transform coefficients or the quantization values of the transform coefficients obtained by said frequency component transformation means; and first output means for generating a code sequence containing encoded data generated by said first entropy encoding means, and externally outputting the code sequence, and said image processing apparatus comprising:

second input means for inputting the code sequence generated by said first output means;

decoding means for entropy-decoding the encoded data contained in the code sequence;

second entropy encoding means for encoding the transform coefficients or the quantization values of the transform coefficients decoded by said decoding means using second entropy coding different from the first entropy coding; and second output means for externally outputting a code sequence containing encoded data generated by said second entropy encoding means.

16. The system according to claim 15, wherein the first entropy coding is Golomb coding.

17. The system according to claim 15, wherein the second entropy coding is arithmetic coding.

18. The system according to claim 15, wherein said first output means outputs the code sequence containing the encoded data generated by said first entropy encoding means to a predetermined storage means, said second input means inputs the code sequence from the storage device, and said second output means outputs the code sequence containing the encoded data generated by said second entropy encoding means to the storage device.

19. The system according to claim 15, wherein the image is one frame image of a moving image.

20. The system according to claim 15, wherein said second output means selectively outputs a code sequence that gradually improves spatial resolution, and a code sequence that gradually improves image quality, in accordance with an input from an external apparatus.

21. The system according to claim 20, wherein said second output means also outputs a code sequence containing encoded data of an image in accordance with an input from the external apparatus.

22. The system according to claim 20, wherein the external apparatus is an apparatus for decoding the encoded data contained in the code sequence output from said second output means.

23. The system according to claim 21, wherein the external apparatus is an apparatus for decoding the encoded data contained in the code sequence output from said second output means.

24. An image processing apparatus comprising:
input means for inputting encoded image data encoded using first entropy coding;
first decoding means for obtaining transform coefficients or quantization values of the transform coefficients by decoding the encoded image data;
encoding means for generating encoded data by encoding the transform coefficients or the quantization values of the transform coefficients obtained by said first decoding means using second entropy coding different from the first entropy coding, and generating a code sequence containing the encoded data;
second decoding means for obtaining the transform coefficients or the quantization values of the transform coefficients by entropy-decoding the encoded data contained in the code sequence; and
image reconstruction means for reconstructing an image on the basis of the transform coefficients or the quantization values of the transform coefficients.

25. An image processing apparatus comprising:
input means for inputting an image;
frequency component transformation means for computing frequency component of the image to obtain transform coefficients or quantization values of the transform coefficients;
first entropy encoding means for encoding the transform coefficients or the quantization values of the transform coefficients obtained by said frequency component transformation means by first entropy coding;
decoding means for entropy-decoding the encoded data;
second entropy encoding means for encoding the transform coefficients or the quantization values of the transform coefficients decoded by said decoding means using second entropy coding different from the first entropy coding; and
output means for externally outputting a code sequence containing encoded data generated by said second entropy encoding means.

26. An image output apparatus comprising:
input means for inputting a code sequence containing encoded data, which is obtained by encoding transform coefficients or quantization values of the transform coefficients obtained by decoding encoded data encoded using first entropy coding, using the second entropy coding different from the first entropy coding;
decoding means for obtaining the transform coefficients or the quantization values of the transform coefficients by entropy-decoding the encoded data contained in the code sequence; and
image reconstruction means for reconstructing an image on the basis of the transform coefficients or the quantization values of the transform coefficients.

27. An image processing method comprising:
the input step of inputting encoded image data encoded using first entropy coding;
the first decoding step of obtaining transform coefficients or quantization values of the transform coefficients by decoding the encoded image data;
the encoding step of generating encoded data by encoding the transform coefficients or the quantization values of the transform coefficients obtained in the first decoding step using second entropy coding different from the first entropy coding, and generating a code sequence containing the encoded data;
the second decoding step of obtaining the transform coefficients or the quantization values of the transform coefficients obtained by entropy-decoding the encoded data contained in the code sequence; and
the image reconstruction step of reconstructing an image on the basis of the transform coefficients or the quantization values of the transform coefficients.

28. A computer readable storage medium storing a program code for implementing an image processing method cited in claim 27.

29. An image processing method comprising:
the input step of inputting an image;
the frequency component transformation step of computing frequency component of the image to obtain transform coefficients or quantization values of the transform coefficients;
the first entropy encoding step of encoding the transform coefficients or the quantization values of the transform coefficients obtained in the frequency component transformation step by first entropy coding;
the decoding step of entropy-decoding the encoded data;
the second entropy encoding step of encoding the transform coefficients or the quantization values of the transform coefficients decoded in the decoding step using second entropy coding different from the first entropy coding; and
the output step of externally outputting a code sequence containing encoded data generated in the second entropy encoding step.

30. A computer readable storage medium storing a program code for implementing an image processing method cited in claim 27.

31. An image output method comprising:

the input step of inputting a code sequence containing encoded data, which is obtained by encoding transform coefficients or quantization values of the transform coefficients obtained by decoding encoded data encoded using first entropy coding, using the second entropy coding different from the first entropy coding;

the decoding step of obtaining the transform coefficients or the quantization values of the transform coefficients by entropy-decoding the encoded data contained in the code sequence; and the image reconstruction step of reconstructing an image on the basis of the transform coefficients or the quantization values of the transform coefficients.

32. A computer readable storage medium storing a program code for implementing an image output method cited in claim 31.

* * * * *

UNITED STATES PATENT AND TRADEMARK OFFICE
CERTIFICATE OF CORRECTION

PATENT NO.    : 6,847,735 B2
DATED         : January 25, 2005
INVENTOR(S)   : Kajiwara et al.

It is certified that error appears in the above-identified patent and that said Letters Patent is hereby corrected as shown below:

<u>Title page,</u>
Item [*] Notice, should read -- Subject to any disclaimer, the term of this patent is extended or adjusted under 35 U.S.C. 154(b) by 703 days. --

Signed and Sealed this

Twenty-eighth Day of June, 2005

JON W. DUDAS
*Director of the United States Patent and Trademark Office*